US012373792B2

(12) United States Patent
Dodeja et al.

(10) Patent No.: US 12,373,792 B2
(45) Date of Patent: Jul. 29, 2025

(54) GENERATING MULTISTATE VECTOR OBJECTS FOR VARIANT REVIEW AND APPLICATION

(71) Applicant: Adobe Inc., San Jose, CA (US)

(72) Inventors: Nitesh Dodeja, Delhi (IN); Avneet Kaur, New Delhi (IN)

(73) Assignee: Adobe Inc., San Jose, CA (US)

( * ) Notice: Subject to any disclaimer, the term of this patent is extended or adjusted under 35 U.S.C. 154(b) by 19 days.

(21) Appl. No.: 18/365,704

(22) Filed: Aug. 4, 2023

(65) Prior Publication Data

US 2025/0045696 A1    Feb. 6, 2025

(51) Int. Cl.
| | |
|---|---|
| *G06Q 10/101* | (2023.01) |
| *G06F 16/583* | (2019.01) |
| *G06T 11/20* | (2006.01) |
| *G06T 11/40* | (2006.01) |
| *G06T 11/60* | (2006.01) |

(52) U.S. Cl.
CPC ......... *G06Q 10/101* (2013.01); *G06F 16/583* (2019.01); *G06T 11/203* (2013.01); *G06T 11/40* (2013.01); *G06T 11/60* (2013.01)

(58) Field of Classification Search
CPC ... G06Q 10/101; G06F 16/583; G06T 11/203; G06T 11/40; G06T 11/60
See application file for complete search history.

(56) References Cited

U.S. PATENT DOCUMENTS

| | | | | |
|---|---|---|---|---|
| 2015/0324490 A1* | 11/2015 | Page | ................. | G06Q 30/0621 700/98 |
| 2022/0237672 A1* | 7/2022 | Tang | ................. | G06Q 30/0603 |

OTHER PUBLICATIONS

Liu Yuanchun et al., Design and Implementation of Photographic Community System Based on ASP-NET MVC, Sep. 1, 2019, International Symposium on Distributed Computing and Application for Business Engineering and Science, pp. 112-115 (Year: 2019).*

Tetsiua Upsjoda et al., A Method for Supporting Software Design based on Comment on Software, Jan. 1, 2000, IEEE International Workshop on Robot and Human Interactive Communications, pp. 311-315 (Year: 2000).*

* cited by examiner

*Primary Examiner* — Tam T Tran
(74) *Attorney, Agent, or Firm* — Keller Preece PLLC

(57) ABSTRACT

The present disclosure is directed toward systems, methods, and non-transitory computer readable media that provide a graphical review interface for curating, reviewing, and approving digital design element variants utilizing multistate vector objects within a digital image. The disclosed systems generate, in response to a user interaction performed at a designer device, a digital image comprising a multistate vector object modifiable to depict variants of a graphical element within the digital image. Further, the disclosed systems provide the digital image for display within a variant review interface on a client device for reviewing the variants of the graphical element. Moreover, the disclosed systems receive, from the client device, an indication of a selected variant from among the variants indicated by the multistate vector object. The disclosed systems also generate a modified digital image reflecting the selected variant and send the modified digital image reflecting the selected variant to the designer device.

20 Claims, 16 Drawing Sheets

GENERATING MULTISTATE VECTOR OBJECTS FOR VARIANT REVIEW AND APPLICATION

BACKGROUND

Advancements in computing devices and computer design applications have given rise to a variety of innovations in computer image design when using digital image editing software and when distributing computer images as part of a design review process. For example, image design systems have developed that provide tools for creating variants of design elements within digital designs. In addition to the creation process, the process of reviewing, approving, and applying variants of design elements within existing image design systems often involves multiple iterations of transmitting digital documents back and forth between designer devices and reviewer devices. Due in part to the above, existing image design systems exhibit a number of disadvantages or shortcomings, especially with regard to computational efficiency and navigational efficiency.

SUMMARY

One or more embodiments provide benefits and/or solve one or more of the foregoing or other problems in the art with systems, methods, and non-transitory computer readable storage media that provide specialized user interfaces for curating, reviewing, and approving digital design element variants using multistate vector objects. For example, the disclosed systems utilize multistate vector objects to provide an enhanced creation process for creating variants of a design element of a digital image within a variant curation interface on a designer device. In one or more implementations, the disclosed systems further provide the multistate vector objects to reviewer devices to provide variant selection elements that visually represent different states of a multistate vector object. In some cases, based on receiving an indication of a selected variant from the reviewer device, the disclosed systems generate a selection comment that indicates the selected variant for approval by the designer device. In one or more embodiments, the disclosed systems generate a modified digital image reflecting the selected variant based on an approval input from the designer device to apply the selected variant (e.g., the selected version of the multistate vector object) to the digital image. In some cases, to facilitate the variant review process, the disclosed systems utilize a delta-based storage to efficiently store variant deltas that represent differences between design variants and a base state of a multistate vector object.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
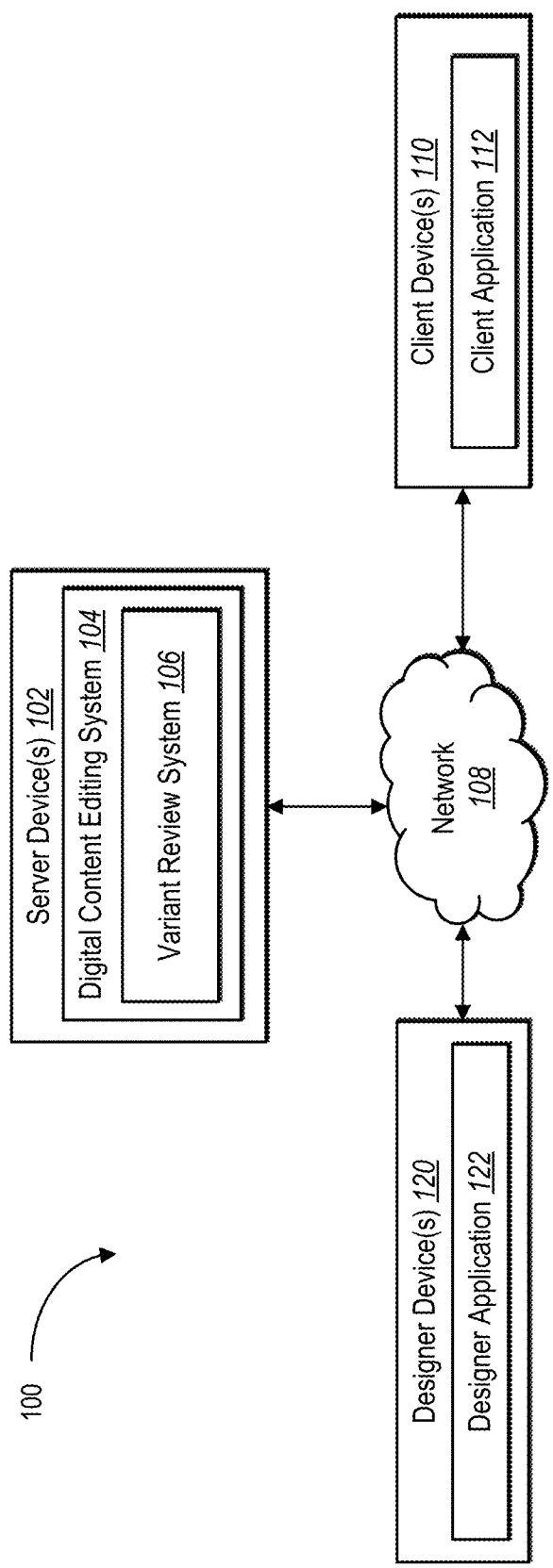
FIG. 1 illustrates a schematic diagram of an example environment of a variant review system in accordance with one or more embodiments.

This disclosure describes one or more embodiments of a variant review system that utilizes multistate vector objects (supported by delta-based storage) to provide graphical user interfaces for the curation, review, and approval of variants of digital design elements within digital images or images. As discussed above, conventional image design systems have a number of technical shortcomings with regard to computational efficiency and navigational efficiency when implementing the review process within a creative workflow. In particular, many conventional image design systems consume excessive amounts of computing resources, such as processing power and memory, in generating, storing, and transmitting multiple digital images or documents for a single review process. For example, some conventional systems generate, store, and transmit multiple iterations or versions of a single document or image to convey proposed design variants (e.g., where the different versions/iterations each depict different variants) of a graphical design element to a recipient device. Storing multiple versions of entire documents or images for variants of a single design element requires excessive amounts of computer memory or storage that could otherwise be preserved with more efficient systems. Additionally, transmitting multiple versions of entire documents or images also consumes excessive network resources that could result in network delays, network congestion, and slower network performance.

In addition, conventional image design systems often generate and provide inefficient graphical user interfaces. Indeed, to accommodate a review process involving multiple variants of a graphical design element, conventional systems often either transmit multiple versions individually in separate interfaces (e.g., in separate communications) or transmit them in a single communication that includes multiple distinct interfaces (e.g., multiple digital artboards). In either case, the interfaces of existing systems are navigationally inefficient, requiring excessive user interactions to access desired data and/or functionality. For example, using the interfaces of conventional systems, the review process requires either navigating through multiple interfaces in separate communications or navigating through multiple interfaces provided in a single communication to access each of the design variants. On top of these navigational efficiencies, in many conventional systems, the review process further requires multiple separate applications, one for generating design variants and another for transmitting versions of digital images reflecting the design variants (and for providing feedback regarding the different design variants) between designer devices and client devices.

To improve upon existing image design systems, in some embodiments, the variant review system provides a specialized computer application (or an update to an existing computer application) that facilitates generating, distributing, reviewing, and applying design variants for digital images. To facilitate the improvements of the specialized computer application, in some cases, the variant review system generates and utilizes multistate vector objects. For example, the variant review system generates a digital image that includes a multistate vector object which is modifiable to depict variants of a graphical element. In certain embodiments, the variant review system generates multistate vector objects to have different states to reflect variations in appearance, style, and/or functionality for graphical design elements. For instance, when the state of an object is changed, the variant review system updates the properties of the multistate vector object associated with that state within a digital image. Indeed, in some cases, the variant review system generates a multistate vector object that can have multiple states associated with it for toggling or switching between the different variants of a graphical design element.

As mentioned, in one or more embodiments, the variant review system generates and utilizes variant deltas to represent modifications to a base state of a multistate vector object (e.g., modifications that define different variants of a graphical design element, where the base state defines a base appearance/state of the graphical design element). In certain embodiments, to store variants of an object using multistate vector objects, the variant review system stores only the differences between a base object state of the multistate vector object and additional states corresponding to (or defining) respective variants. Thus, to modify the appearance of a graphical design element within a digital image, in some cases, the variant review system accesses and applies a stored delta that defines the modification to the base state of the multistate vector object.

In one or more embodiments, the variant review system generates variants (and corresponding deltas for a multistate vector object) based on designer device interactions. For example, the variant review system receives a variant creation input from a designer device to create a variant for a graphical element within a digital image. In response to the variant creation input, in some embodiments, the variant review system generates a multistate vector object to represent multiple variants of the graphical element within the digital image. In certain cases, the variant review system further provides the digital image, along with the multistate vector object, to a client device for review.

To elaborate, in some embodiments, the variant review system provides visual representations of each of the variants of the graphical element for display within a variant review interface on a client device. In some cases, the variant review system further updates the multistate vector object of the digital image to reflect a selected variant in response to a variant selection from the client device. In certain embodiments, the variant review system also generates a selection comment indicating the selected variant and provides the selection comment to the designer device (e.g., to indicate which design variant was selected).

As also mentioned, in one or more embodiments, the variant review system resolves selection comments to apply selected variants. For example, the variant review system receives a selection to resolve or apply a selected variant from a designer device. In some cases, based on the resolution of the selected variant, the variant review system generates a modified digital image by applying a variant delta to modify the base state of the multistate vector object and to thus generate a modified digital image that depicts or reflects the design variant selected by the client device.

As suggested above, embodiments of the variant review system can provide a variety of advantages over conventional design systems. For instance, the variant review system can improve computational efficiency relative to conventional systems. For example, the variant review system uses multistate vector objects and delta-based storage to reduce the amount of data stored, transmitted, and processed for variants of a digital design. By utilizing delta-based storage, the variant review system reduces the overall storage space required for maintaining multiple states of a digital image. Indeed, while prior systems often store and transmit multiple versions of a digital image as entire copies of the digital image, the variant review system stores only variant deltas which encode or define the specific differences that make up design variants (e.g., in relation to a base state of a multistate vector object). Further, when transmitting or transferring variants of a digital image over a network, the variant review system facilitates more efficient data transfer by only transmitting a single copy of a digital image along with its variant deltas (instead of sending multiple complete image copies for the different states). The variant review system thus utilizes fewer computing and network resources, such as processing power, memory, and bandwidth, than prior systems.

Along these lines, using variant deltas enables embodiments of the variant review system to reduce the computational resources needed for processing multiple versions of a digital image. For example, instead of modifying and rendering pixels of complete images for each different version of a design element, the variant review system renders design variants by updating a multistate vector object (e.g., by applying a variant delta). The variant review system thereby reduces computational complexity of rendering digital image variants. These computational efficiency gains are particularly pronounced when dealing with complex or resource-intensive objects and/or when digital images include many variants for multiple design elements.

In addition to improving computational efficiency, embodiments of the variant review system also provide improvements in navigational efficiency as well. For example, the variant review system generates and provides more efficient graphical user interfaces than prior systems. Indeed, whereas some prior systems require multiple interfaces and/or applications for reviewing and transmitting design variants, the variant review system provides a single computer application that facilitates creation, review, and approval of design variants all together. Indeed, the variant review system can generate and provide a variant curation interface and a variant review interface as part of a single application, where the variant curation interface is a designer-device perspective, and the variant review interface is a client-device perspective. In some cases, as opposed to prior systems that require multiple interfaces to present different variations of a digital image, the variant review system consolidates the presentation of multiple design variants into a single variant review interface, where the different variants are switchable or toggleable to present the variants of a design element. Compared to prior systems, the variant review system thus reduces the number of user interactions required to access desired data and/or functionality.

Additional detail regarding the variant review system will now be provided with reference to the figures. For example, FIG. 1 illustrates a schematic diagram of an exemplary system environment ("environment") 100 in which a variant review system 106 operates. As illustrated in FIG. 1, the environment 100 includes server device(s) 102, a network 108, client device(s) 110, and designer device(s) 120.

Although the environment 100 of FIG. 1 is depicted as having a particular number of components, the environment 100 is capable of having any number of additional or alternative components (e.g., any number of servers, client devices, or other components in communication with the variant review system 106 via network 108). Similarly, although FIG. 1 illustrates a particular arrangement of the server device(s) 102, the network 108, client device(s) 110, and designer device(s) 120, various additional arrangements are possible.

The server device(s) 102, the network 108, client device(s) 110, and designer device(s) 120 are communicatively coupled with each other either directly or indirectly (e.g., through the network 108 discussed in greater detail below in relation to FIG. 12). Moreover, the server device(s) 102, client device(s) 110, and designer device(s) 120 include one of a variety of computing devices (including one or more computing devices as discussed in greater detail with relation to FIG. 12).

As illustrated in FIG. 1, the environment 100 includes the server device(s) 102. The server device(s) 102 generates, tracks, stores, processes, receives, and transmits electronic data, including digital images. For example, the server device(s) 102 receives or monitors interactions across the client device(s) 110 and designer device(s) 120. In some implementations, the server device(s) 102 transmit content to the client device(s) 110 to cause the client device(s) 110 to display content associated with digital images. For example, the server device(s) 102 can present a digital image to client device(s) 110 and display the digital image on the client device(s) 110 with the digital image displayed corresponding to system need (e.g., provide a digital image for display via client application(s) 112). In some implementations, the server device(s) 102 transmit content to the designer device(s) 120 to cause the designer device(s) 120 to display content associated with digital images. For example, the server device(s) 102 can present a digital image to designer device(s) 120 and display the digital image on the designer device(s) 120 with the digital image displayed corresponding to system need (e.g., provide a digital image for display via designer application(s) 122).

Additionally, the server device(s) 102 includes all, or a portion of, the variant review system 106. For example, the variant review system 106 operates on the server device(s) 102 to access digital images, determine digital design element changes, and provide localization of element changes to the client device(s) 110. In one or more embodiments, via the server device(s) 102, the variant review system 106 generates and displays digital images based on modification of elements within the digital images. Example components of the variant review system 106 will be described below with regard to FIG. 9.

Furthermore, as shown in FIG. 1, the illustrated system includes the client device(s) 110. In some embodiments, the client device(s) 110 include, but are not limited to, mobile devices (e.g., smartphones, tablets), laptop computers, desktop computers, or another type of computing devices, including those explained below in reference to FIG. 12. Some embodiments of client device(s) 110 are operated by a user to perform a variety of functions via respective client application(s) 112 such as the review and selection of variants of multistate elements (defined by multistate vector objects) within digital images. The client device(s) 110 include one or more applications (e.g., the client application(s) 112 that can access, edit, modify, store, and/or provide, for display, digital images. For example, in some embodiments, the client application(s) 112 include a software application installed on the client device(s) 110. In other cases, however, the client application(s) 112 include a web browser or other application that accesses a software application hosted on the server device(s) 102.

Furthermore, as shown in FIG. 1, the illustrated system includes the designer device(s) 120. In some embodiments, the designer device(s) 120 include, but are not limited to, mobile devices (e.g., smartphones, tablets), laptop computers, desktop computers, or another type of computing devices, including those explained below in reference to FIG. 12. Some embodiments of designer device(s) 120 are operated by a user to perform a variety of functions via respective designer application(s) 122 such as the curation and approval of variants of multistate elements within digital images. The designer device(s) 120 include one or more applications (e.g., the designer application(s) 122 that can access, edit, modify, store, and/or provide, for display, digital images. For example, in some embodiments, the designer application(s) 122 include a software application installed on the designer device(s) 120. In other cases, however, the designer application(s) 122 include a web browser or other application that accesses a software application hosted on the server device(s) 102.

The variant review system 106 can be implemented in whole, or in part, by the individual elements of the environment 100. Indeed, as shown in FIG. 1 the variant review system 106 can be implemented with regard to the server device(s) 102, the client device(s) 110, and/or at the designer device(s) 120. In particular embodiments, the variant review system 106 on the client device(s) 110 and/or designer device(s) 120 comprises a web application, a native application installed on the client device(s) 110 and/or designer device(s) 120 (e.g., a mobile application, a desktop application, a plug-in application, etc.), or a cloud-based application where part of the functionality is performed by the server device(s) 102.

In additional or alternative embodiments, the variant review system 106 on the client device(s) 110 and/or designer device(s) 120 represents and/or provides the same or similar functionality as described herein in connection with the variant review system 106 on the server device(s) 102. In some implementations, the variant review system 106 on the server device(s) 102 supports the variant review system 106 on the client device(s) 110 and/or designer device(s) 120.

In some embodiments, the variant review system 106 includes a web hosting application that allows the client device(s) 110 and/or designer device(s) 120 to interact with content and services hosted on the server device(s) 102. To illustrate, in one or more implementations, the client device(s) 110 and/or designer device(s) 120 accesses a web page or computing application supported by the server device(s) 102. The client device(s) 110 and/or designer device(s) 120 provides input to the server device(s) 102

(e.g., selected content items). In response, the variant review system 106 on the server device(s) 102 generates/modifies a digital image. The server device(s) 102 then provides the digital image to the client device(s) 110 and/or designer device(s) 120.

In some embodiments, though not illustrated in FIG. 1, the environment 100 has a different arrangement of components and/or has a different number or set of components altogether. For example, in certain embodiments, the client device(s) 110 and/or designer device(s) 120 communicate directly with the server device(s) 102, bypassing the network 108. As another example, the environment 100 includes a third-party server comprising a content server and/or a data collection server.

Figure 2:
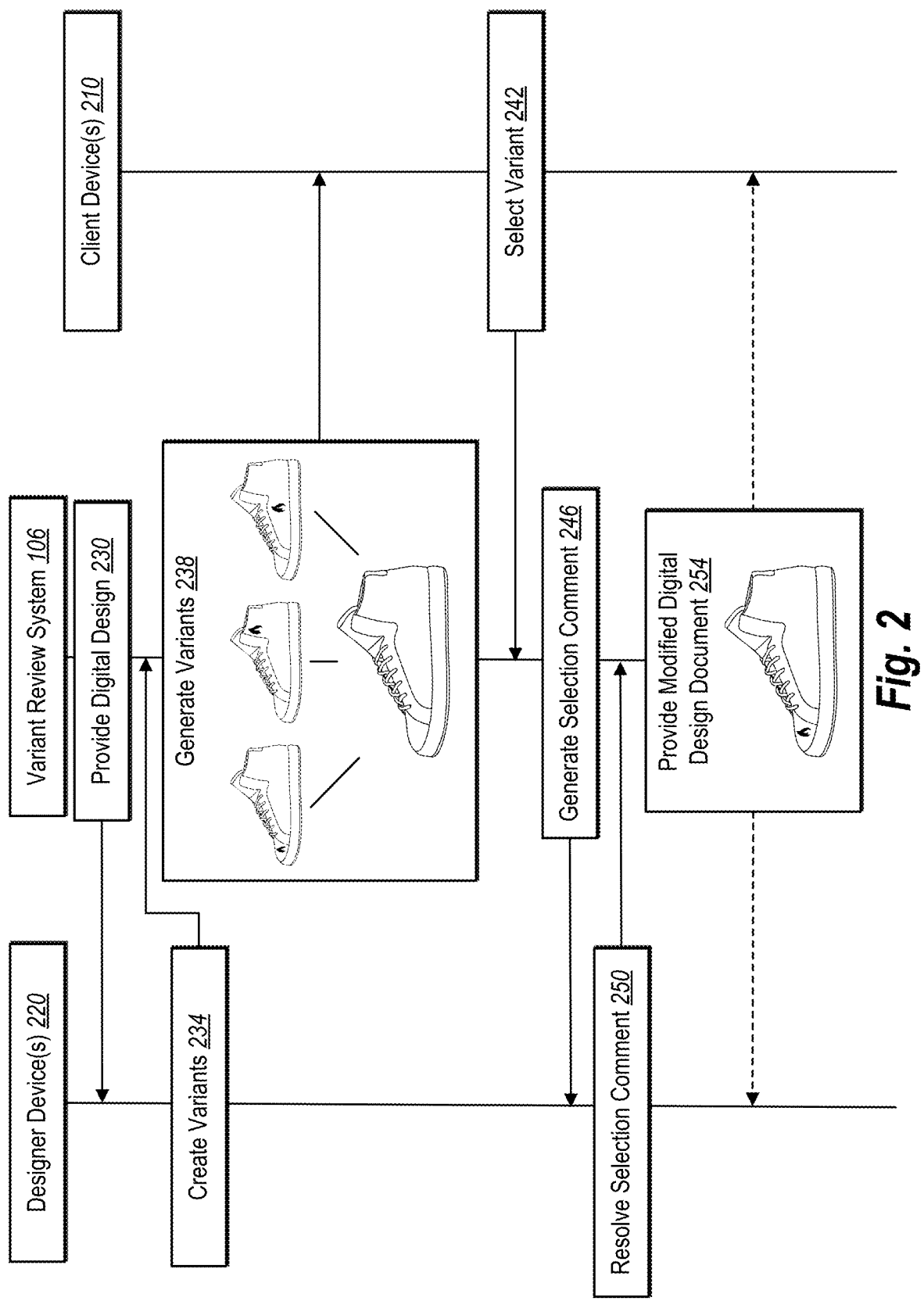
FIG. 2 illustrates an example overview of using a variant review system to generate, curate, and apply variants within a digital image in accordance with one or more embodiments.

As previously mentioned, in one or more embodiments, the variant review system 106 generates and modifies digital design content including multistate vector objects utilizing an efficient graphical user interface. For instance, FIG. 2 illustrates an overview diagram of generating, reviewing, and applying variants of a multistate vector object within a digital image in accordance with one or more embodiments. Additional detail regarding the various acts of FIG. 2 is provided thereafter with reference to subsequent figures.

As shown in FIG. 2, the variant review system 106 performs act 230 to provide a digital design for display on a designer device(s) 220. For example, the variant review system 106 receives a request from the designer device(s) 220 to generate a digital image that includes one or more design elements. Indeed, the designer device(s) 220 receives user interaction to create and arrange design elements within a digital image using a particular user interface (e.g., a variant curation interface) of a digital content editing application. In response, the variant review system 106 generates and provides a digital design for display on the designer device(s) 220 in accordance with the user interactions. In some cases, a digital image contains information, elements, objects, and configuration related to a specific digital design. In particular, the digital image includes all the visual elements required for the digital design, such as illustrations, vector objects, shapes, text, icons, and patterns.

As further shown, the designer device(s) 220 performs act 234 to create variants for a digital image. To elaborate, the designer device(s) 220 receives user interaction within a variant curation interface to design and arrange design elements and corresponding variants of the design elements. For instance, the designer device(s) 220 receives user interaction to create variants of different colors, sizes, shapes, fonts, or other variations in visual appearance for various design elements. In some embodiments, a variant refers to a modified or alternative version of an existing digital design element created within the digital image using digital tools and techniques. For example, a variant defines or represents a modification of visual characteristics associated with a design element, such as background color, line width for a particular object, font style, or placement/coordinates of a particular design element.

The designer device(s) 220 further provides indications of the user interactions for creating variants to the variant review system 106. In response, the variant review system 106 performs an act 238 to generate variants. Particularly, the variant review system 106 generates variants of a design element to reflect the modifications indicated by user interaction with the designer device(s) 220. Additionally, the variant review system 106 generates variant deltas of a multistate vector object that define or represent the different variants of a design element. More specifically, the variant review system 106 generates a multistate vector object that defines or represents a design element and further generates a variant delta to represent each variant of the design element (e.g., as a delta, or a difference, between a base state of the multistate vector object and a modified state indicated by a variant). Example modifications of multistate vector objects that are definable using variant deltas include color, shape, composition, texture, position, font size, font style, and/or other visual characteristics of a design element.

As further shown, the variant review system 106 provides variants for display on the client device(s) 210. For example, the variant review system 106 provides computer code defining a base state of a multistate vector object for a design element and further provides computer code defining the variant deltas for the respective variants differing from the base state of the multistate vector object. Additionally, as illustrated in FIG. 2, the client device(s) 210 performs act 242 to select a variant (from among the set of variants generated in act 238) of the multistate vector object of the digital design within the digital image. For example, the client device(s) 210 receives, via a variant review interface, a user interaction to select a variant from among the variants provided by the variant review system 106.

As further shown in FIG. 2, based on receiving an indication of a selected variant from the client device(s) 210, the variant review system 106 performs act 246 to generate a selection comment. More particularly, the variant review system 106 generates a selection comment that indicates the selected variant (selected in act 242) within the digital image. For example, the variant review system 106 generates a selection comment as an interface element that visually indicates the selected variant and that also includes a selectable option for applying the selected variant to the corresponding design element within the digital image (e.g., by modifying a multistate vector object according to a respective variant delta). As shown, the variant review system 106 provides the selection comment to the designer device(s) 220.

As further illustrated in FIG. 2, in response to receiving the selection comment, the designer device(s) 220 performs act 250 to resolve (e.g., approve or not approve) the selection comment. In particular, the designer device(s) 220 receives user interaction via the variant curation interface (modified to include the selection comment) to select an option for resolving the selection comment (associated with the selection comment generated in act 246). For example, the variant review system 106 resolves the selection comment by applying the selected variant and altering the visual appearance of a design element within a digital image (e.g., by applying a variant delta to the corresponding multistate vector object).

As further shown, the variant review system 106 performs act 254 to provide the modified digital image for display. In some cases, the variant review system 106 provides the modified digital image for display on the designer device(s) 220 and/or the client device(s) 210. Indeed, based on resolving the selection comment, the variant review system 106 provides an modified multistate vector object (defining the changes in visual appearance of the digital design indicated by the selection comment) to the designer device(s) 220 and/or the client device(s) 210 to cause the device(s) to present the modified digital image. In one or more embodiments, the variant review system 106 provides an indication of the associated changes to the client device(s) 210 and/or the designer device(s) 220.

Figure 3:
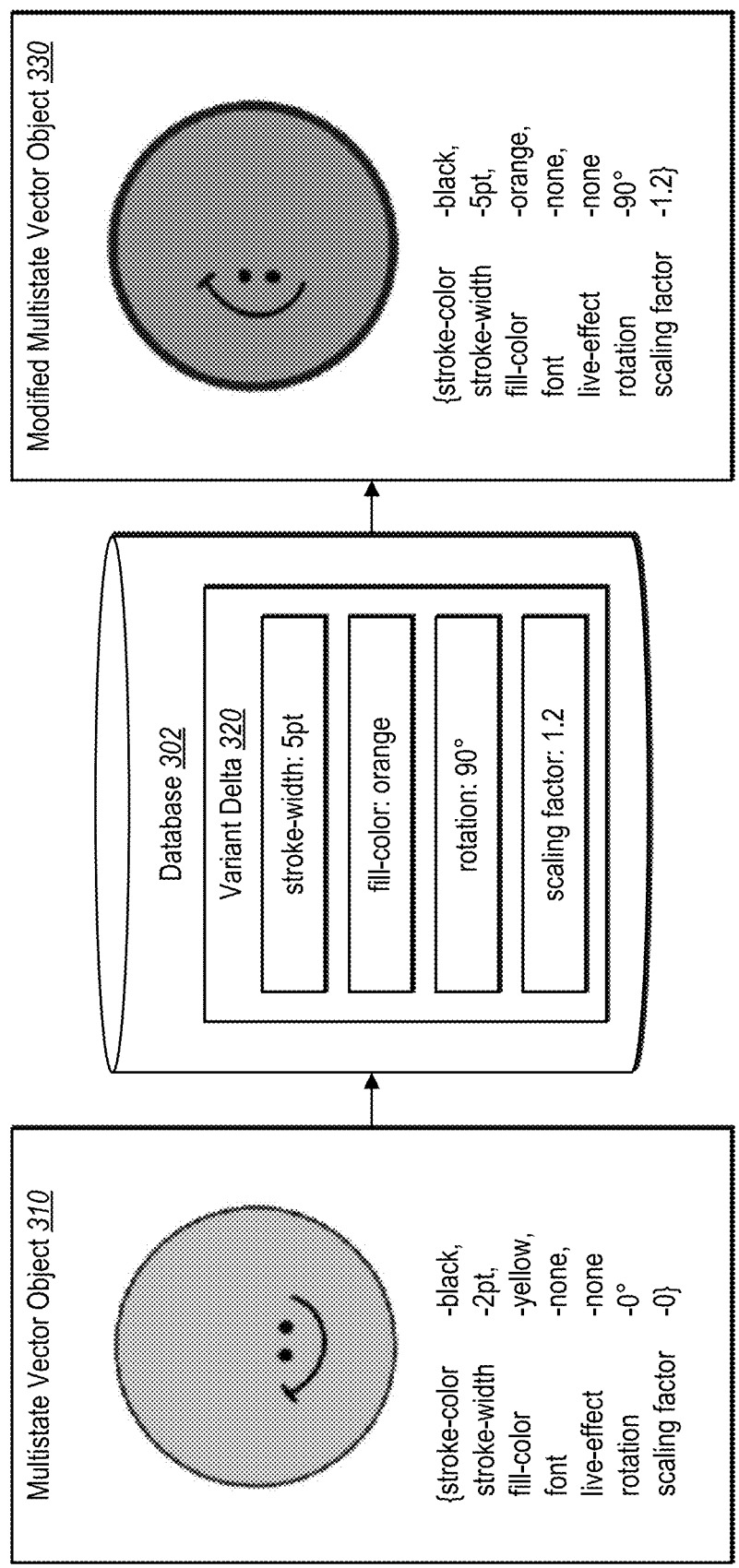
FIG. 3 illustrates an example of using variant deltas to represent a modified multistate vector object in accordance with one or more embodiments.

As mentioned above, the variant review system 106 creates, selects, and resolves variants within a digital image utilizing multistate vector objects, variant deltas, and delta-based storage. FIG. 3 illustrates an example of using variant deltas to represent a modified multistate vector object in accordance with one or more embodiments.

As shown in FIG. 3, the variant review system 106 utilizes variant deltas to generate modified multistate vector objects from multistate vector objects. In particular, the variant review system 106 supports different variants for a digital design by utilizing a multistate vector object (e.g., text, Bezier curve, image) within the digital design and that is modifiable to represent multiple variants as modified versions or states within the digital design (e.g., to reflect changes in appearance, style, and/or functionality). In one or more embodiments, the variant review system 106 encodes the modifications or differences between a multistate vector object 310 and a modified multistate vector object 330 (e.g., encodes a variant) in the form of a variant delta 320. Indeed, the variant review system 106 generates the variant delta 320 to encode differences in various visual properties, such as appearance styles (fill, stroke, opacity), live effects (drop shadow, gaussian blur, glow, distort etc.), text styles (font family, font style, font size, paragraph styles etc.), and other visual characteristics. The variant review system stores the variant delta 320 within a database 302.

In one or more implementations, the variant review system 106 represents or defines a design element in a vector design (e.g., a digital image) as a multistate vector object $\theta$. In some cases, the multistate vector object $\theta$ is a primitive object such as a geometric shape that serves as a baseline building block for more complex designs (e.g., points, lines, polygons, circles, squares, cubes, spheres, and cylinders). In some embodiments, the multistate vector object $\theta$ is a group object that includes multiple individual objects grouped into a single entity. For instance, the variant review system 106 utilizes group objects that encompass multiple constituent objects (e.g., as child objects/nodes branching from a parent node representing a base state of the multistate vector object $\theta$), which can include a combination of either primitive objects or group objects. In some embodiments, the variant review system 106 represents an order of child nodes o contained within a group object as a sequence in which child nodes are arranged or positioned relative to their parent node (e.g., based on depth and position in the object tree). Further, the variant review system 106 represents a variant delta 320 using a symbol $\delta$ as to signify a difference between two vector objects (e.g., the difference between the multistate vector object 310 and the modified multistate vector object 330). As mentioned, the variant review system 106 utilizes a variant delta $\delta$ to apply or implement modifications to the appearance of a digital image.

To illustrate, as shown in FIG. 3, the variant review system 106 first generates a base object state as the multistate vector object 310, namely State 0. In one or more implementations, the variant review system 106 utilizes the following Variant Curation Algorithm to generate a base state and corresponding variants of the multistate vector object 310:

---

Variant Curation Algorithm:

---

Require: Selected object $\theta$
  procedure CREATEVARIANT($\theta$)
    for i = 1, 2, . . . . . , N do
      if i = 1 then
        $\theta_{Base} \leftarrow \theta$                                   > Mark the selected object as Base State
      else
        if $\theta$ is primitive then
           $\delta_i \leftarrow$ PropertiesDiff ($\theta_i, \theta_{Base}$)    > Store $\delta_i$ in timestamp based database
        else                                                    > Group Object
           if there is Addition/Removal/Reordering of child nodes then
               o$_i \leftarrow$ Order of $\theta_i$ child nodes
           for all ChildObject in $\theta_i$ do
               CREATEVARIANT(ChildObject)

---

The variant review system 106 determines the properties of a multistate vector object 310 to create the base state as shown in the Variant Curation Algorithm. In the example shown in FIG. 3, the variant review system 106 determines properties for the multistate vector object 310 including a stroke-color of black, a stroke-width of 2 pt, a fill-color of yellow, a font of none, a live-effect of none, a rotation of 0 degrees, and a scaling factor of 0. In some embodiments, the multistate vector object 310 represents a variant of a base state that has different properties (e.g., no color and/or blank features, such as an empty circle).

As further shown in FIG. 3, to create variants of the multistate vector object 310 the variant review system 106 utilizes the variant delta 320. In particular, the variant review system 106 determines modifications made to design element properties via a variant curation interface and generates the variant delta 320 to reflect the property changes. In addition, the variant review system 106 applies the variant delta 320 which defines or encodes the property deltas or differences indicated by the alterations (modifications, additions, or deletions) to the multistate vector object 310 detailing the specific changes that have occurred. As illustrated by the above algorithm, for variant states (e.g., n>0), the variant review system 106 stores only the differences between state n and state 0 (rather than entire copies of the image), such as those differences encoded by the variant delta 320. Accordingly, to generate the modified multistate vector object 330, the variant review system 106 applies the variant delta 320 to the multistate vector object 310 such that the different properties from state n are applied to the multistate vector object 310, resulting in the modified multistate vector object 330.

As shown in FIG. 3, by applying the variant delta 320 to the multistate vector object 310, the variant review system 106 generates a modified multistate vector object 330 with properties including a stroke-color of black, a stroke-width of 2 pt, a fill-color of yellow, a font of none, a live-effect of none, a rotation of 90 degrees, and a scaling factor of 1.2. Notably, the variant review system 106 modifies only those properties with changes of the variant delta 320 and does not modify the properties not represented in the variant delta 320. In the example shown in FIG. 3, the variant review system 106 does not store unmodified values in the variant delta 320 (such as values for stroke-color, font, and live-effect).

As a result of storing the variant delta 320, as mentioned above, the variant review system 106 reduces computational overhead. Specifically, by utilizing the variant delta 320 to represent the changes (and only the changes) made to the multistate vector object 310, the variant review system 106 reduces the memory storage requirements compared to prior systems that store entire image versions. Indeed, instead of reprocessing or transmitting the data for an entire image for each variation, the variant review system 106 processes and transmits only the variant delta 320, or the specific modifications.

Figure 4A:
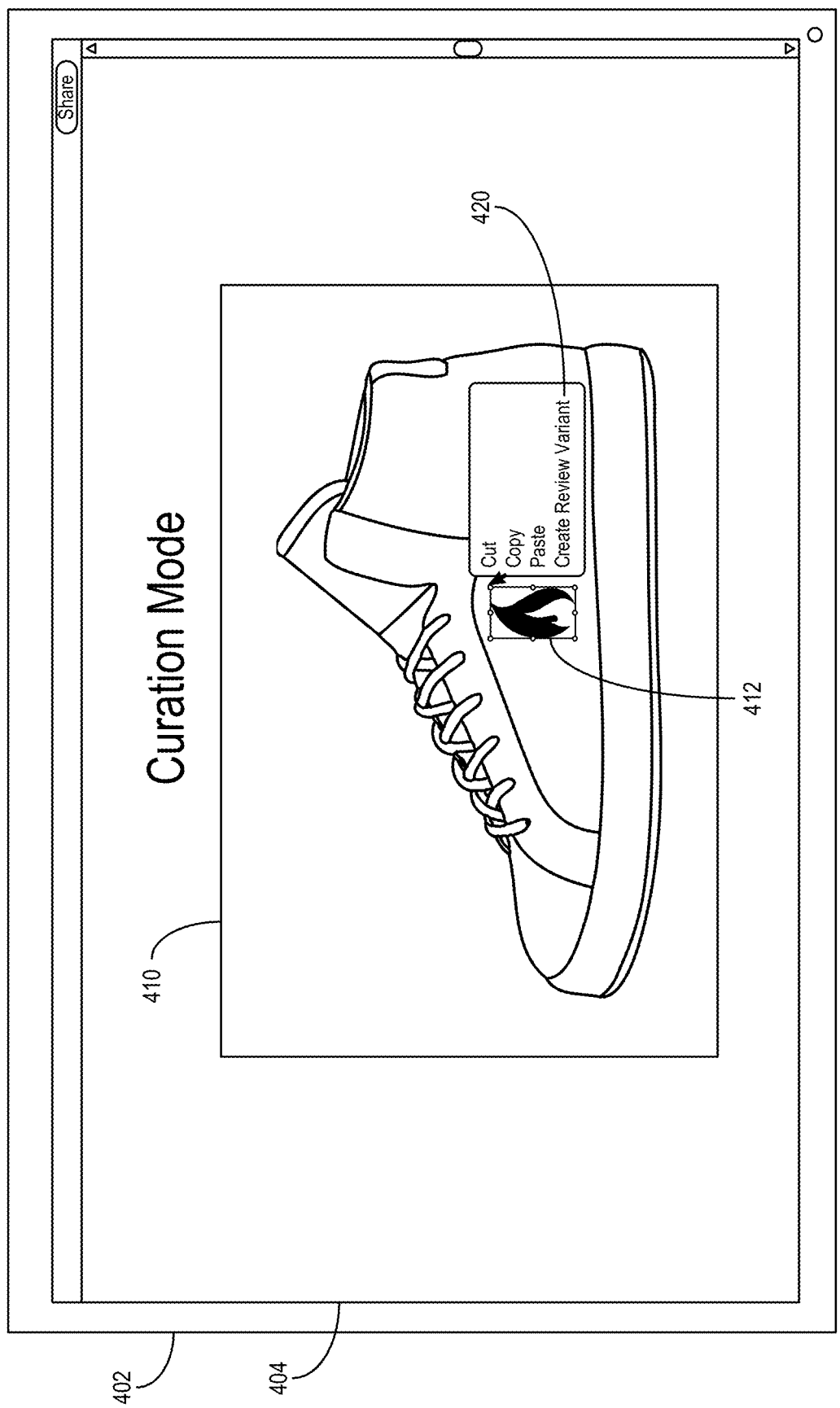
FIGS. 4A-4B illustrate utilizing a variant curation interface to create variants of a graphical element in accordance with one or more embodiments.
Figure 4B:
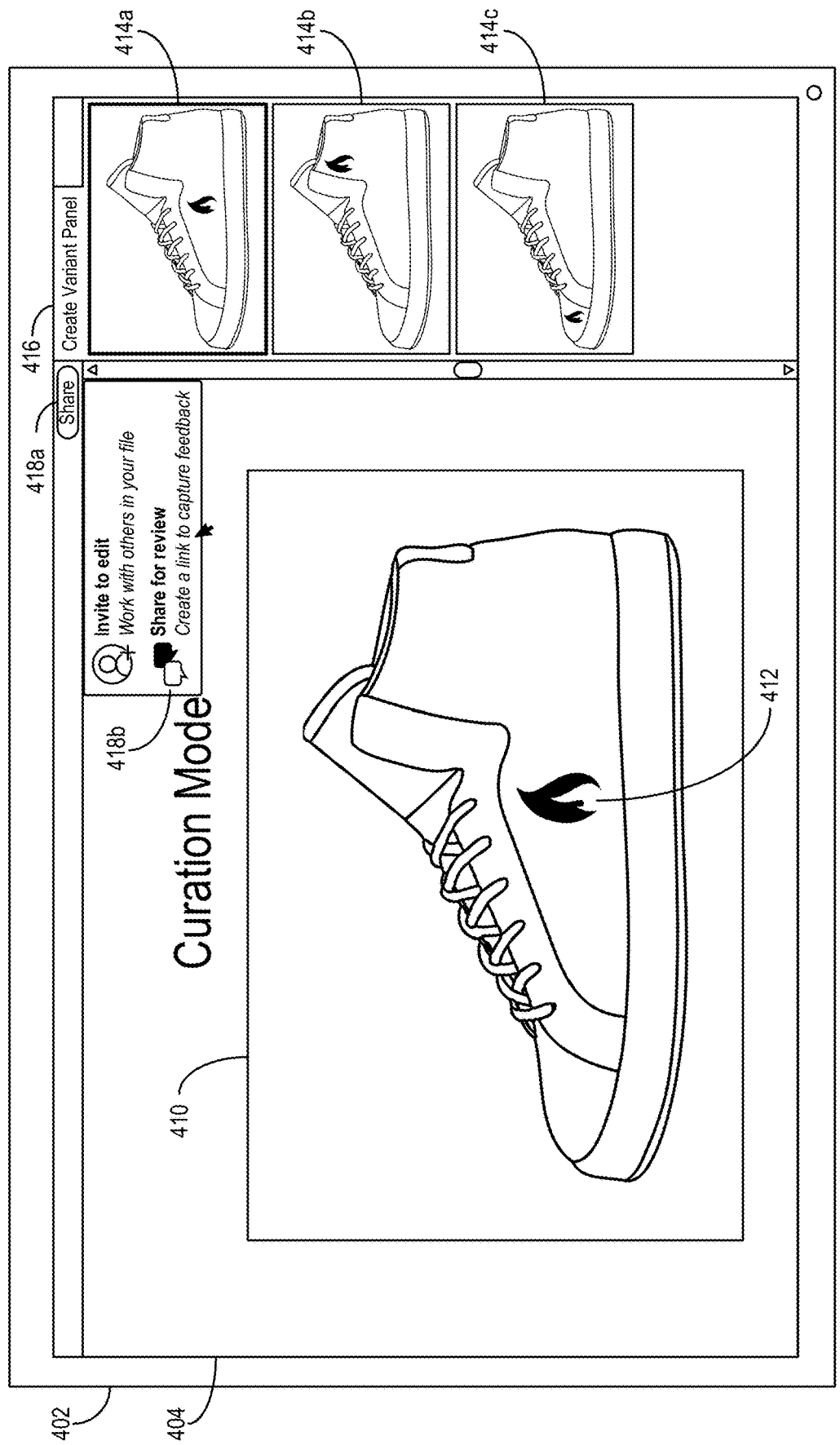

As previously mentioned, in one or more embodiments, the variant review system 106 provides a variant curation interface to the designer device. FIGS. 4A-4B illustrate utilizing a variant curation interface to create variants of a graphical element in accordance with one or more embodiments.

As shown in FIGS. 4A-4B, the variant curation interface 404 includes elements for presenting the digital design, creating digital design variants, and sharing the digital design variants for review. As part of this process, the variant review system 106 provides the digital image 410 for display within the variant curation interface 404 for creating design variants. Indeed, the variant review system 106 accepts or receives input from the designer device 402 to create, design, and arrange a graphical design element 412. For example, the designer device 402 receives user interactions to create variants of the graphical design element 412 through the variant curation interface 404 (e.g., using various digital art implements or tools). In some cases, the variant review system 106 provides a menu element which includes an option 420 (e.g., "Create Review Variant") selectable to create a variant from the graphical design element 412. To elaborate, based on a selection of the option 420, the variant review system 106 generates a variant delta to encode the modifications made to the graphical design element 412 via interactions within the variant curation interface 404 in relation to a base state of a corresponding multistate vector object (which represents an unmodified base state of the graphical design element 412).

As shown in FIG. 4B, the variant review system 106 can generate multiple variants for a single graphical design element (or a single multistate vector object). For example, based on interaction within the variant curation interface 404, the variant review system 106 creates corresponding variants of the graphical design element 412. For instance, the designer device 402 receives user interactions to create variants that reflect differences in visual appearance for the graphical design element 412. As shown, the variant review system 106 creates and arranges variant 414a, variant 414b, and variant 414c. In addition, the variant curation interface 404 provides a create variant panel 416 to organize and display the variants of a selected graphical element (e.g., the graphical design element 412). As shown, the variant curation interface 404 can present the variants in relation to the digital image 410 (e.g., showing the entire shoe reflecting the variants). In certain embodiments, the variant curation interface 404 can present the variants in isolation (e.g., showing the variants of the graphical element without showing the shoe at all or with showing a partial shoe as background). To illustrate, based on designer device interaction with the digital image 410, the variant curation interface 404 displays the variants within the create variant panel 416 in different ways such as: in isolation, on selected sections of the digital design, on the entire digital design, and/or within a zoomed in section of the digital design.

As shown, the variant curation interface 404 presents the variants on the designer device 402 in an organized and visually accessible manner. For example, the variant curation interface 404 displays the variant 414a, the variant 414b, and the variant 414c within the create variant panel 416 along with a separate section for the display of the digital image 410 that depicts a selected variant from the create variant panel 416. Furthermore, in one or more embodiments, the variant curation interface 404 allows the designer device 402 (or the variant review system 106) to filter or sort the displayed variants within the create variant panel 416 based on specific criteria or characteristics (e.g., based on color, style, position, size, creation time, complexity, or any other design attributes).

To further illustrate, as shown, the variant curation interface 404 provides interactive features that allow the designer device 402 (or the variant review system 106) to create and switch between the variants 414a, the variant 414b, and/or the variant 414c. As shown, the variant curation interface 404 accepts user input selecting variant 414a (as shown by the darker line around variant 414a) and displays the selected variant 414a on the digital image 410. Notably, when the variant review system 106 receives designer device 402 input to change the properties of a variant of the graphical design element 412, the variant review system 106 updates the properties (e.g., by generating a variant delta) associated with the new state for a corresponding multistate vector object. Furthermore, the variant curation interface 404 displays the modified graphical design element that reflects the updated state of the multistate vector object based on the variant delta.

As further shown, the variant curation interface 404 accepts designer device input for sharing variants for review. In particular, based on designer device interaction with the "Share" element 418a, the variant curation interface 404 provides options to share the digital image including the "Share for review" element 418b. In one or more implementations, the variant review system 106 shares variants by sharing the digital image 410 along with a multistate vector object for the graphical design element 412 and variant deltas defining the respective variants (e.g., one for each of the variant 414a, the variant 414b, and the variant 414c) . . . . In some cases, the variant review system 106 generates and provides a link to the digital image 410.

Figure 5A:
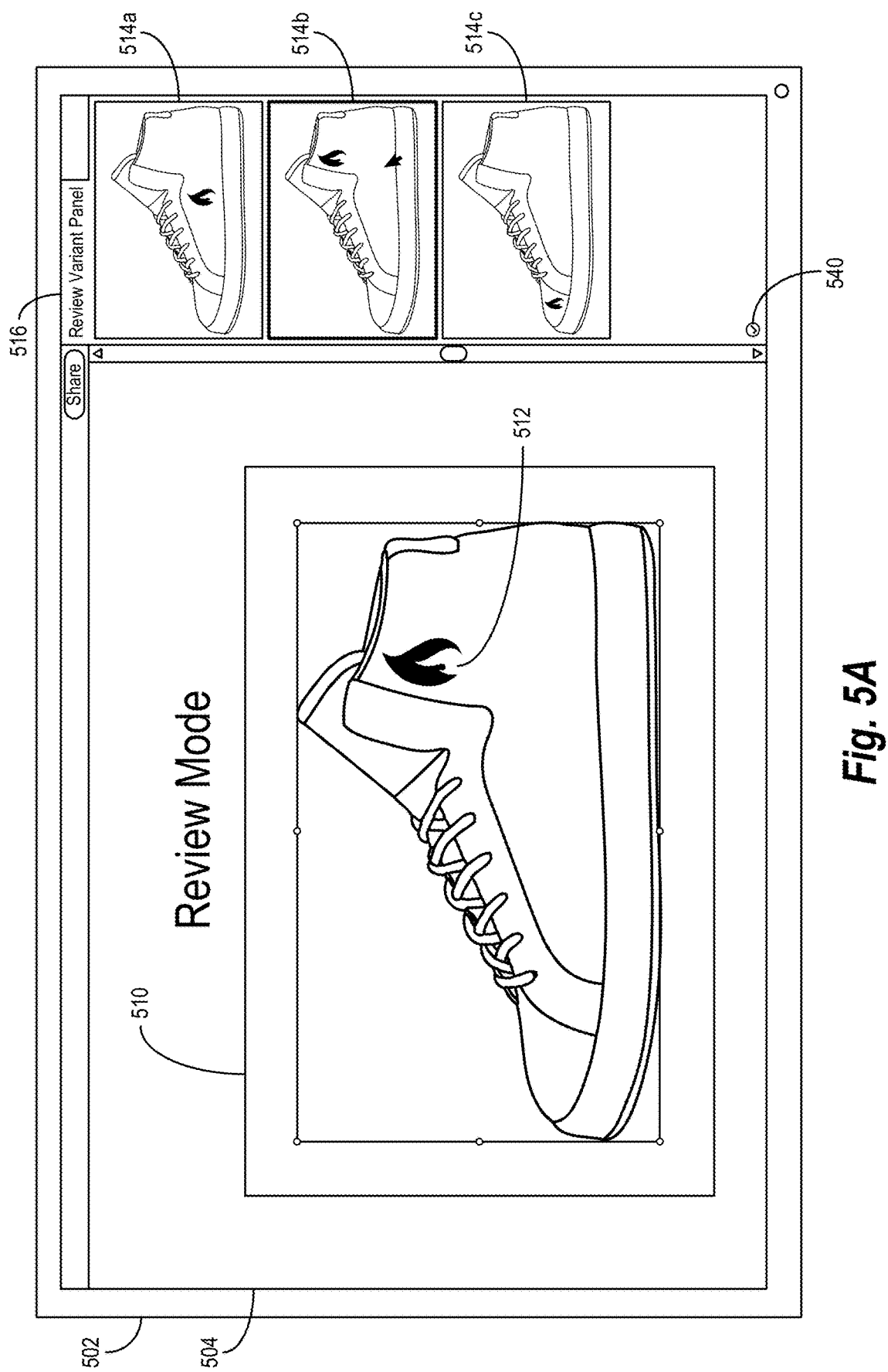
FIGS. 5A-5B illustrate utilizing a variant review interface to select a variant of a graphical element in accordance with one or more embodiments.
Figure 5B:
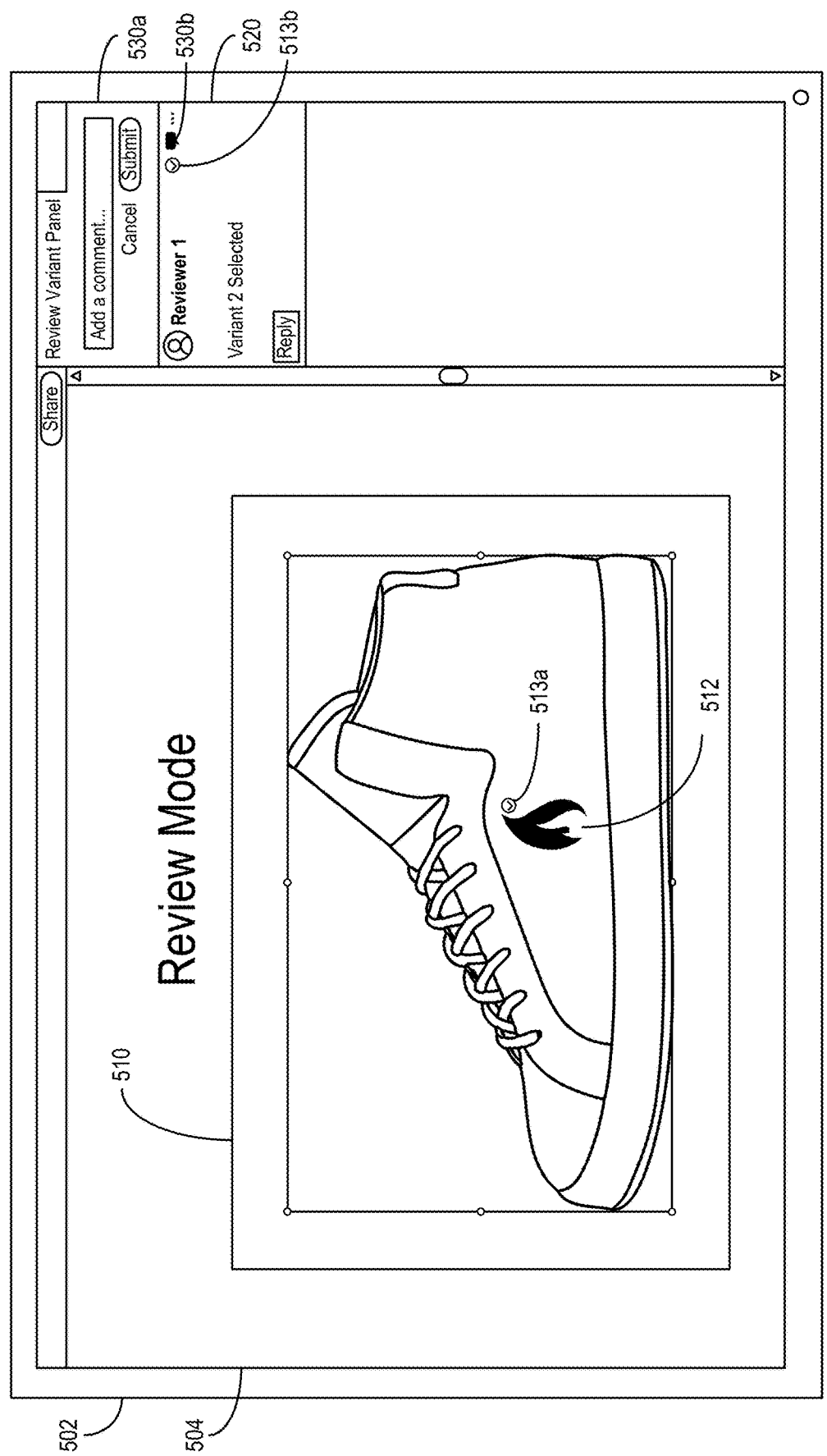

As previously mentioned, in one or more embodiments, the variant review system 106 provides a variant review interface to the designer device. FIGS. 5A-5B illustrate utilizing a variant review interface in accordance with one or more embodiments.

As illustrated in FIG. 5A, the client device 502 displays a variant review interface 504. The variant review interface 504 includes elements for displaying the digital image 510, together with elements for toggling or switching between different variants of a graphical design element 512. In particular, based on sharing from a designer device, the variant review system 106 provides the digital image 510 to the client device 502 for presenting different variants created via the designer device. As shown, the variant review interface 504 displays the digital image 510 along with the variants of the graphical design element 512 within a review variant panel 516. For example, the variant review interface 504 displays the variant 514a, the variant 514b, and the variant 514c within the review variant panel 516.

As also shown in FIG. 5A, the review variant panel 516 to presents the variant 514a, the variant 514b, and the variant 514c as selectable interface elements for viewing the respective variants in the main viewing panel. In some cases, the variant review interface 504 presents the variants in relation to the digital image 510 (e.g., showing the entire shoe) or in other views (e.g., showing the generated variants without the shoe or with a partial shoe). Furthermore, in one or more embodiments, the variant review interface 504 allows the client device 502 to filter or sort the displayed variants within the review variant panel 516 based on specific criteria or characteristics (e.g., based on color, style, position, size, creation time, complexity, or any other relevant design attributes).

As further illustrated in FIG. 5A, the variant review interface 504 provides interactive features that allow the client device 502 to switch between different variants and display the indicated variant directly on the digital image 510. For example, the variant review interface 504 accepts client device input indicating variant 514b (as shown by the darker line around variant 514b) and displays the indicated variant of the graphical design element 512 on the digital image 510. Notably, when the variant review system 106 receives client device input to select a variant, the variant review system 106 applies and displays the properties by modifying the multistate vector object with the appropriate variant delta.

For example, in one or more embodiments, the variant review system 106 implements the Variant Preview Algorithm below to provide a preview of the indicated variant on the variant review interface 504:

device interaction with a confirmation element, the variant review system 106 generates and stores comment object data that defines the selection comment 520 (e.g., object-id and variant-id) as shown below:

```
{ "Comment-payload":
  { "object-id": "unique id of the object in the document",
    "variant-id": "id of the variant selected by the stakeholder"
  }
}
```

Moreover, the variant review system 106 posts the information associated with the selected variant within the selection comment 520 (e.g., selection comment 520, object-id, and variant-id).

As further shown, in one or more embodiments, the variant review system 106 provides elements for the client device 502 to provide additional information associated with the digital image 510. For example, the variant review interface 504 provides a comment element 530a for the client device 502 to add comments associated with the digital image 510. Indeed, based on interaction within the comment element 530a, the variant review system 106 generates a text string to accompany the selection comment 520 upon transmission back to a designer device.

In a similar fashion, the variant review interface 504 provides a comment element 530b for the client device 502 to add comments to accompany the selection comment 520.

---

Variant Preview Algorithm:

Require: Base variant object $\theta_{Base}$,
    Diff of variants $\delta$,
    Child order of variants o
procedure PREVIEWVERSION
    for i = 1, 2, . . . . , N do
      if i = 1 then
        Rasterize $\theta_{Base}$
      else
        $\theta_{Temp} \leftarrow \theta_{Base}$     > Create temp object from Base Object
      if $\theta$ is primitive then
        Modify the properties of $\theta_{Temp}$ from $\delta_i$
        Rasterize $\theta_{Temp}$
      else
        Modify the child order of $\theta_{Temp}$ from $o_i$   > Group Object
        for all ChildObject in $\theta_{Temp}$ do
            PREVIEW VERSION(ChildObject)

---

In addition, the variant review system 106 accepts or receives input from the client device 502 selecting a preferred variant to apply to the digital image 510. As shown, the variant review system 106 receives an indication of a selection of the confirmation element 540 to confirm selection of the variant 514b. In some embodiments, upon receiving an indication of a selection of the confirmation element 540 from the client device 502, the variant review system 106 generates a selection comment.

To elaborate, as illustrated in FIG. 5B, the variant review system 106 generates a selection comment 520 based on confirmation of the variant 514b. For example, based on the selection of variant 514b, the variant review system 106 generates a selection comment 520 to indicate the selected variant 514b (e.g., "Variant 2 selected"). Notably, the selection comment 520 is generated automatically without further client device interaction with the variant review interface 504 (e.g., without message creation on the part of the client device 502). In one or more embodiments, based on client In this way, the variant review system 106 provides multiple methods to add additional contextual information regarding the selection of an indicated variant. The variant review system 106 can thus provide the contextual information to a designer device to accompany a selection comment. As also shown, the variant review interface 504 provides additional elements to indicate the completed selection of the preferred variant of the graphical design element 512 by displaying addition graphical elements. For instance, the variant review interface 504 displays selection element 513a and selection element 513b to visually indicate that the displayed version of the graphical design element 512 reflects the selected variant. In this way, the variant review system 106 provides multiple visual indications of the selected variant on the variant review interface 504.

Figure 6A:
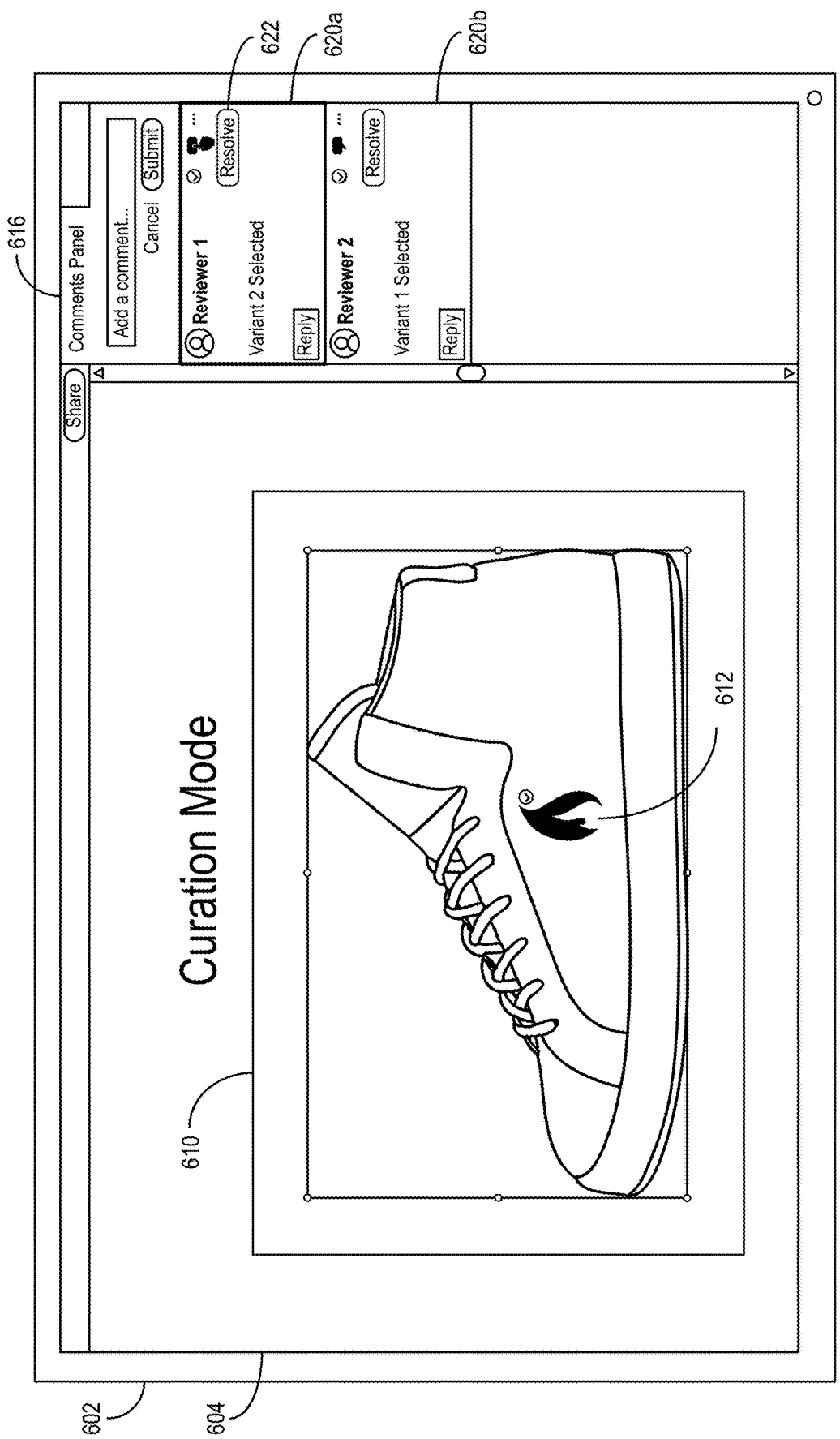
FIGS. 6A-6B illustrate utilizing a variant curation interface to resolve a variant of a graphical element in accordance with one or more embodiments.
Figure 6B:
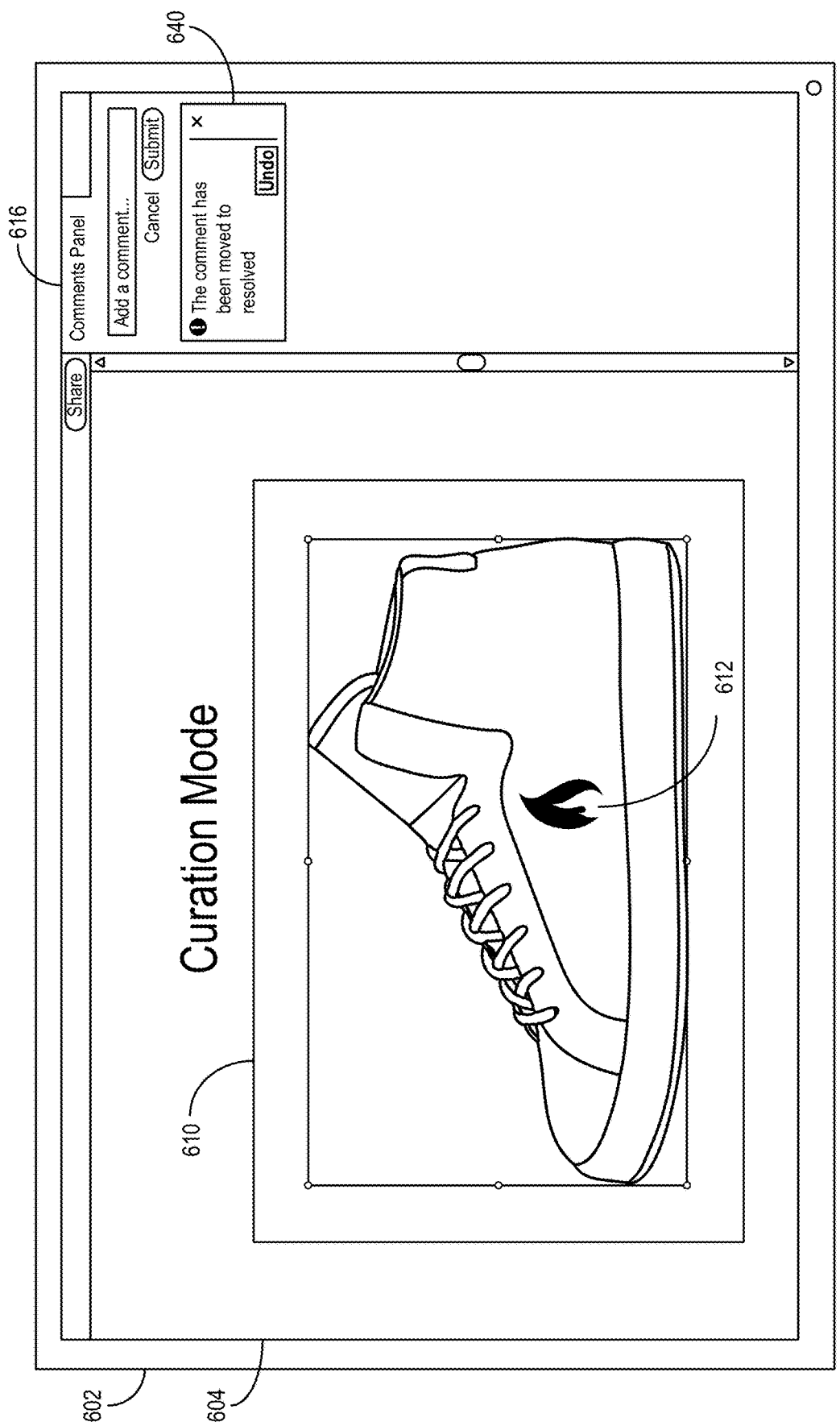

As mentioned above, the variant review system 106 resolves variants to apply the corresponding graphical design elements to a digital image utilizing multistate vector objects and variant deltas. FIGS. 6A-6B illustrate utilizing a variant curation interface to resolve a variant of a graphical element in accordance with one or more embodiments.

As illustrated in FIG. 6A, based on a selection from among candidate variants (as selected via a client device), the variant review system 106 provides a selected variant to a designer device 602 (e.g., the same designer device that created the variants initially). In particular, the variant review system 106 provides the selected variant as part of a digital image 610 depicting a graphical design element 612 reflecting the selected variant. As shown, based on generating and providing a selection comment to the designer device 602, the variant review system 106 further generates and provides a comments panel 616 for managing the selection comments.

Indeed, the comments panel 616 incorporates selection comments from one or more client devices. In some cases, the variant review system 106 provides multiple selection comments for display within the comments panel 616, where the selection comments originate from the same client device or from different client devices (e.g., for different reviewers). For example, based on a selection of a first variant (e.g., the variant 514b) by a first client device (e.g., the client device 502 corresponding to Reviewer 1), the variant review system 106 generates and provides the selection comment 620a within the comments panel 616. In addition, based on a selection of a second variant by a second client device (corresponding to Reviewer 2), the variant review system 106 generates and provides an additional selection comment 620b within the comments panel 616.

In some embodiments, the variant review system 106 determines a variant to apply to the digital image 610 based on selection comments. For instance, the variant review system 106 determines to present graphical design element 612 to reflect the variant associated with the selection comment 620a—as shown by the darker line around selection comment 620a. Specifically, the variant curation interface 604 displays the digital image 610 to depict whichever variant (corresponds to a highlighted or selected selection comment within the comments panel 616. For example, the variant review system 106 applies the corresponding variant delta to modify a base state of the multistate vector object to modify the presentation of the graphical design element 612 within the digital image 610.

To further illustrate, the variant review system 106 incorporates selection comments from multiple client devices by presenting the selection comments in the comments panel 616 in various ways. In some cases, the variant curation interface 604 prioritizes the comments within the comments panel 616 based on the number of client devices that selected each variant. In certain embodiments, the variant curation interface 604 combines and sorts the comments for display in aggregate, in a list, or in groups. In some cases, the variant curation interface 604 prioritizes comments from certain user devices based on the factors such as the status of the user device, importance/relevance of the user device (or associated user account), timeliness of the response, and/or a priority flag associated with the user device (or associated user account).

As illustrated in FIG. 6B, the variant review system 106 incorporates a variant (or does not incorporate a variant) based on designer device interaction. For example, based on a designer device interaction to select a resolve element 622, the variant review system 106 incorporates or applies the selected variant of into the digital image 610. Indeed, based on the selection of the resolve element 622, the variant selected by comment 620a is incorporated into the digital image 610 and the variant selected by comment 620b is not incorporated into the digital image 610. In particular, the variant review system 106 determines a variant delta corresponding to the selected variant (e.g., Variant 2) and applies the variant delta to modify the base state of a multistate vector object defining the graphical design element 612.

To illustrate, the variant review system 106 retrieves the variant-id and corresponding object-id from the data of the selection comment 620a and resolves the selection comment 620a by applying the variant delta indicated by the data. Indeed, utilizing these data, the variant review system 106 extracts the variant data indicated by the selected variant's information (Difference (θ), Child Order (o)) from a database storing variant deltas. The variant review system 106 utilizes the data of the variant delta, including the Difference (δ) and Child Order (o) as parameters to apply to the multistate vector object of the graphical design element 612. In one or more implementations, the variant review system 106 utilizes the following Incorporating Review Feedback Algorithm to apply the variant delta to generate the modified multistate vector object associated with the graphical design element 612:

---
Incorporating Review Feedback Algorithm:

Require: Targeted document object θ,
    Base variant object $θ_{Base}$,
    Selected variant diff $δ_{selected}$,
    Selected variant child order $o_{selected}$
procedure APPLYREVIEWFEEDBACK
    θ ← $θ_{Base}$    > Replace selected object with Base Object
    if θ is primitive then
        Apply $δ_{selected}$ on θ
    else    > Group Object
        Modify the child order of θ based on $o_{selected}$
    for all ChildObject in θ do
        APPLYREVIEWFEEDBACK(ChildObject)

---

As further illustrated in FIG. 6B, the variant review system 106 provides, within the comments panel 616, a comment resolution element 640 that includes an "Undo" element. For example, the variant curation interface 604 provides a comment resolution element 640 that provides confirmation that the comment has been resolved (e.g., approved) by applying the selected variant to the graphical design element 612 and generating a modified version of the digital image 610 reflecting such a change. In addition, the variant review system 106 provides an undo element that is selectable to undo the variant resolution.

Figure 7:
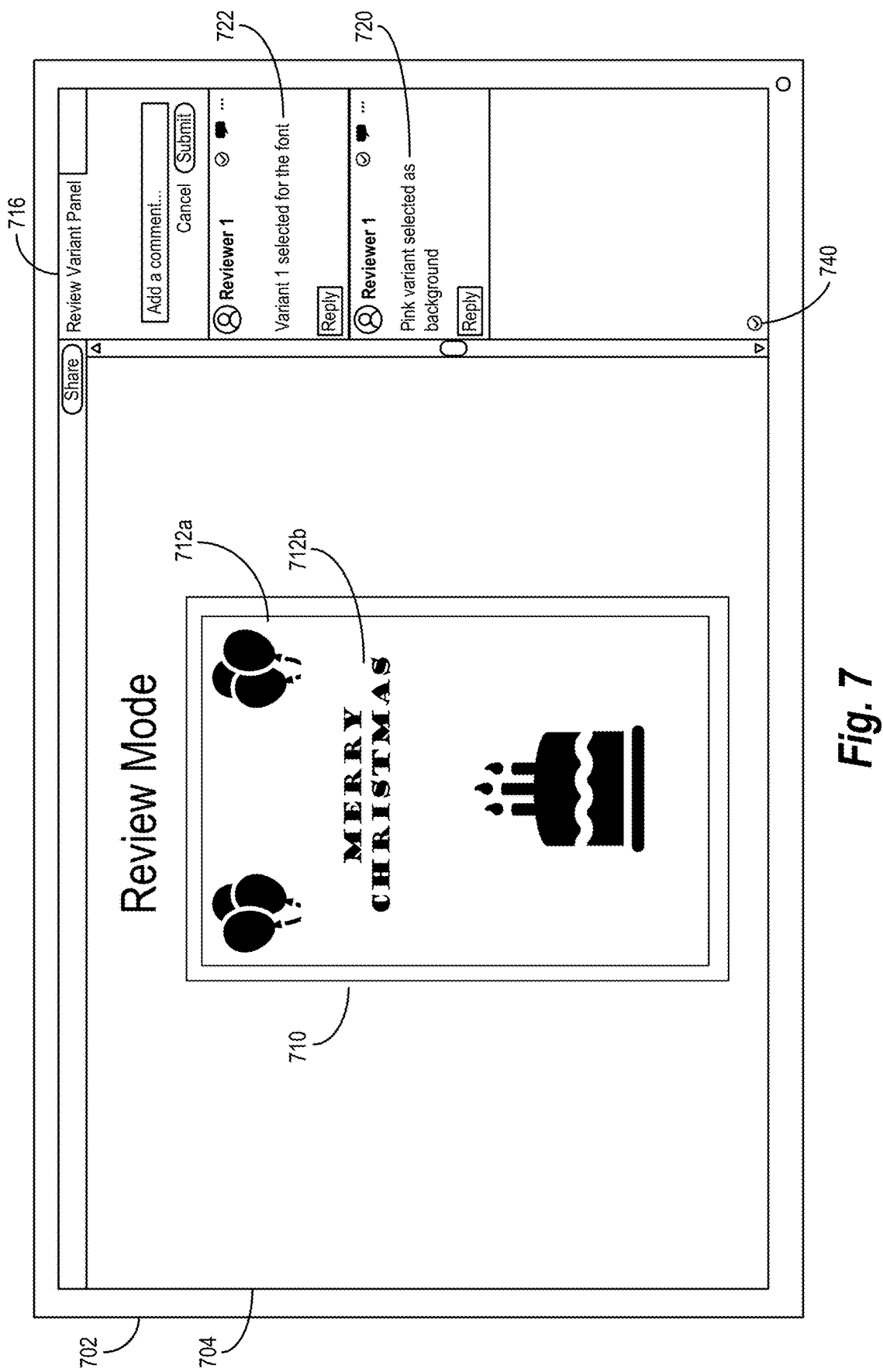
FIG. 7 illustrates utilizing a variant review interface to select multiple variants of multiple graphical elements in accordance with one or more embodiments.

As mentioned, in some embodiments, the variant review system facilitates the selection of variants for multiple graphical elements within a single digital image. FIG. 7 illustrates utilizing a variant review interface to select multiple variants of multiple graphical elements in accordance with one or more embodiments.

As illustrated in FIG. 7, the variant review system 106 provides variants for multiple graphical design elements (each with its own multistate vector object) based on creation of the variants at a designer device. In certain embodiments, the variant review system 106 receives variant creation input to create a first set of variants for a first graphical element and to create a second set of variants for an additional graphical element of the digital image 710. The variant review system 106 thus creates variant deltas for the variants as described herein.

As shown in FIG. 7, the variant review system 106 provides, for display within the variant review interface 704 on the client device 702, interface elements for selecting from among the first set of variants and interface elements for selecting from among the second set of variants. For example, the variant review system 106 provides the graphical design element 712a and the graphical design element 712b as interactive elements selectable to toggle or switch between presenting their respective variants. Indeed, as illustrated, the variant review system 106 provides for the selection of preferred variants for a first graphical design element 712a (e.g., the background color for the holiday card) and provides for the selection of preferred variants for a second graphical design element 712b (e.g., the font for the words "Merry Christmas".

As further shown, based on the selection of a pink variant for the first graphical design element 712a, the variant review system 106 generates the selection comment 720 of "Pink variant selected as background" within the review variant panel 716. As further shown, based on the selection of Variant 1 for the second graphical design element 712b, the variant review system 106 generates the selection comment 722 of "Variant 1 selected for the font" within the review variant panel 716. Additionally, in some cases, the client device 702 receives a selection of the confirmation element 740, whereupon the variant review system 106 provides selection comment 720 and the selection comment 722 to a designer device for resolving.

Figure 8A:
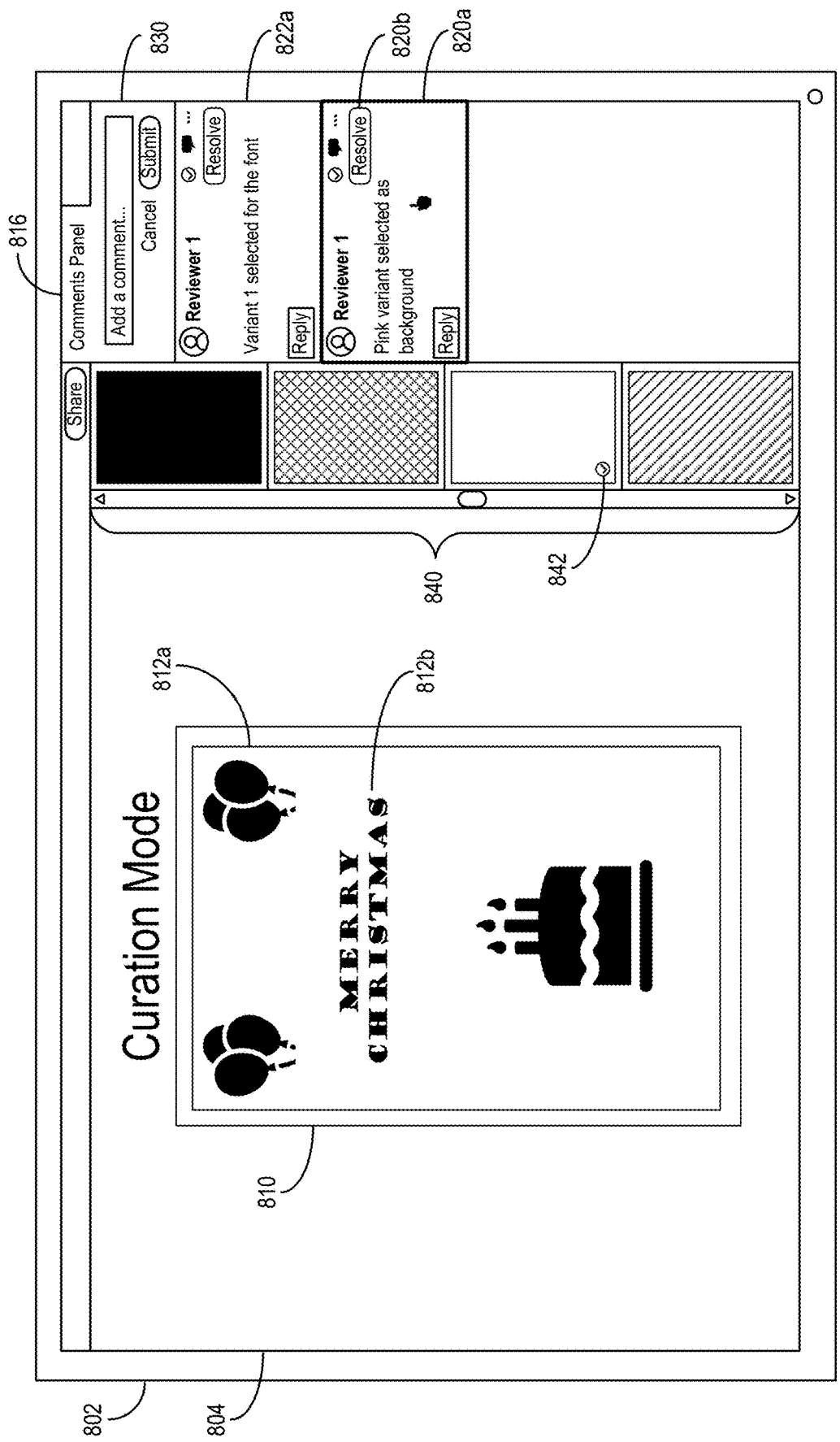
FIGS. 8A-8B utilizing a variant curation interface to resolve multiple variants of multiple graphical elements in accordance with one or more embodiments.
Figure 8B:
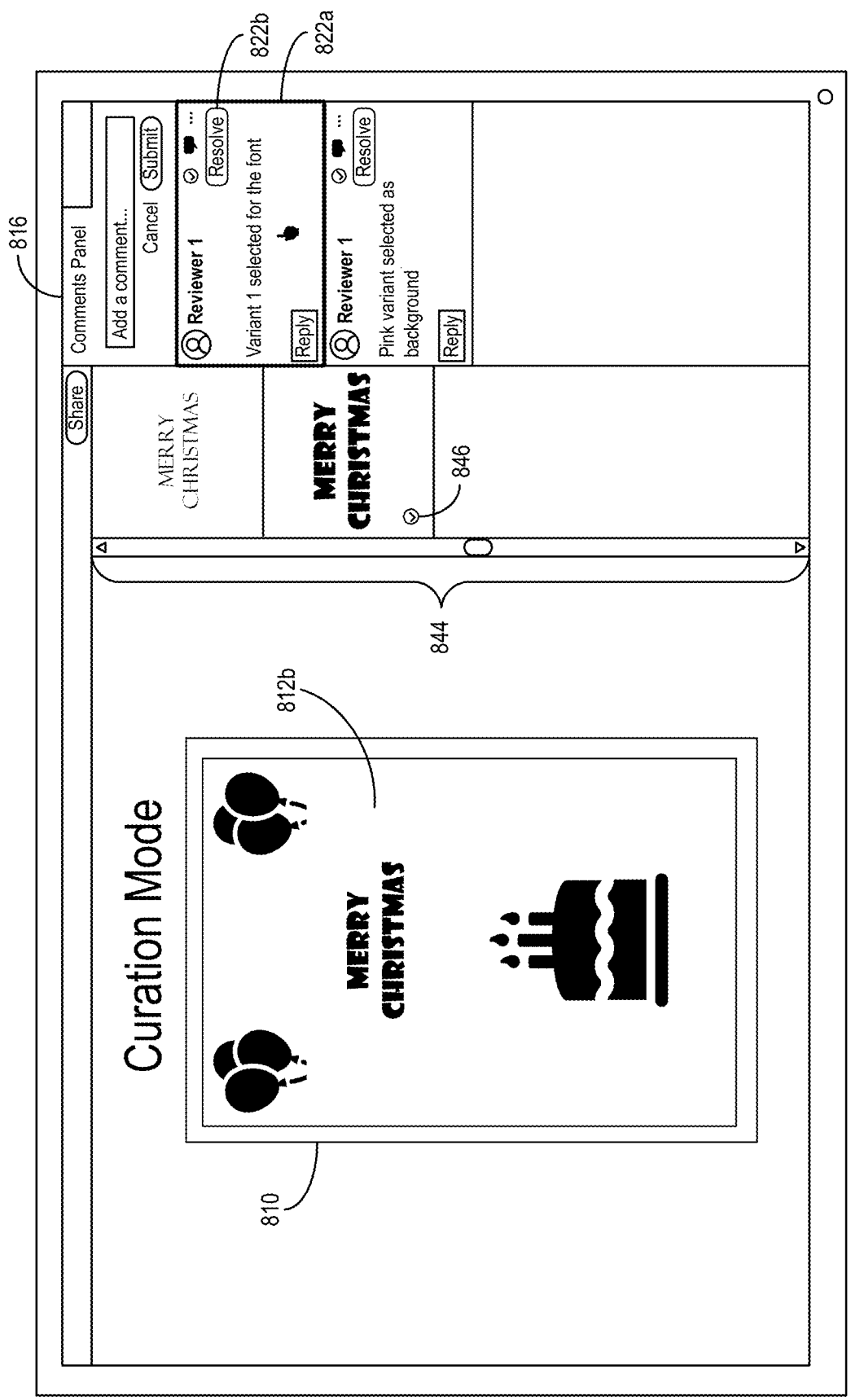

As just suggested, in some embodiments, the variant review system resolves multiple variants (for multiple graphical design elements) within a single digital image. FIGS. 8A-8B illustrate utilizing a variant curation interface to resolve multiple variants of multiple graphical elements in accordance with one or more embodiments.

As illustrated in FIG. 8A, based on the generating selection comments for multiple graphical design elements, the variant review system 106 provides the selection comments to a designer device 802. Indeed, the variant review system 106 provides the selection comments to accompany a digital image 810 for presentation within the variant curation interface 804. As shown in FIG. 8A, the variant curation interface 804 includes the selection comment 820a (e.g., corresponding to selection comment 720) and the selection comment 822a (e.g., corresponding to selection comment 722) within the comments panel 816. In addition, the variant curation interface 804 displays the digital image 810 reflecting the selected variants (e.g., Variant 1 and Pink Variant) indicated by the selection comment 820a and selection comment 822a.

Specifically, as shown, the variant curation interface 804 displays the digital image 810 such that the graphical design element 812a (the background color) and the graphical design element 812b (the text "Merry Christmas") reflect the selected variants. Indeed, as mentioned, the variant review system 106 applies variant deltas to the multistate vector objects representing the respective graphical design elements. Thus, the variant review system 106 modifies the digital image 810 by applying the variant deltas to modify the base state of the multistate vector objects.

As further shown in FIG. 8A, in some cases the variant curation interface 804 displays a variant options panel 840 that includes the variants of the selected graphical design element 812a (e.g., different background colors or patterns). Within the variant options panel 840, the variant review system 106 indicates which of the set of variants has been selected by a client device. Indeed, as shown, the variant curation interface 804 includes a visual indicator 842 that designates the selected variant corresponding to the selection comment 820a. Additionally, based on designer device interaction to select the selection comment 822a, the variant review system 106 updates the variant selection panel to visually indicate which of the font variants has been selected by the client device (as shown in FIG. 8B).

In one or more embodiments, the variant review system 106 also provides a comment element 830 for the designer device 802 to utilize to add comments associated with the digital image 810. In this way, the variant review system 106 provides additional methods to add information regarding the resolution of the selected variant on the variant curation interface 804.

In some embodiments, the variant review system 106 receives input from the designer device 802 to resolve (e.g., approve or not approve) the selection comment 820a. For example, based on input selecting the resolve element 820b, the variant review system 106 incorporates or applies the selected variant (e.g., pink variant) to the graphical design element 812a. In particular, the variant review system 106 determines a variant delta for the corresponding multistate vector object and applies the variant delta to modify the base state of the multistate vector object.

Furthermore, as shown in FIG. 8B, the variant review system 106 provides options for resolving variants of the graphical design element 812b. In particular based on a selection of the selection comment 822a and/or a selection of the graphical design element 812b, the variant review system 106 provides a variant options panel 844 that includes the variants of the selected graphical design element 812b. As also shown, the variant curation interface 804 includes a visual indicator 846 that indicates the selected variant corresponding to the selection comment 822a. In certain embodiments, the variant review system 106 accepts designer device interaction with the variant options panel 844 to change the display of the graphical design element 812b on the digital image 810.

Moreover, the variant review system 106 accepts input from the designer device 802 to resolve the selection comment 822a. For example, based on input selecting the resolve element 822b, the variant review system 106 incorporates the selected variant (e.g., Variant 1) into the graphical design element 812b. In particular, the variant review system 106 determines a variant delta for the corresponding multistate vector object and applies the variant delta to modify the base state of the multistate vector object.

Figure 9:
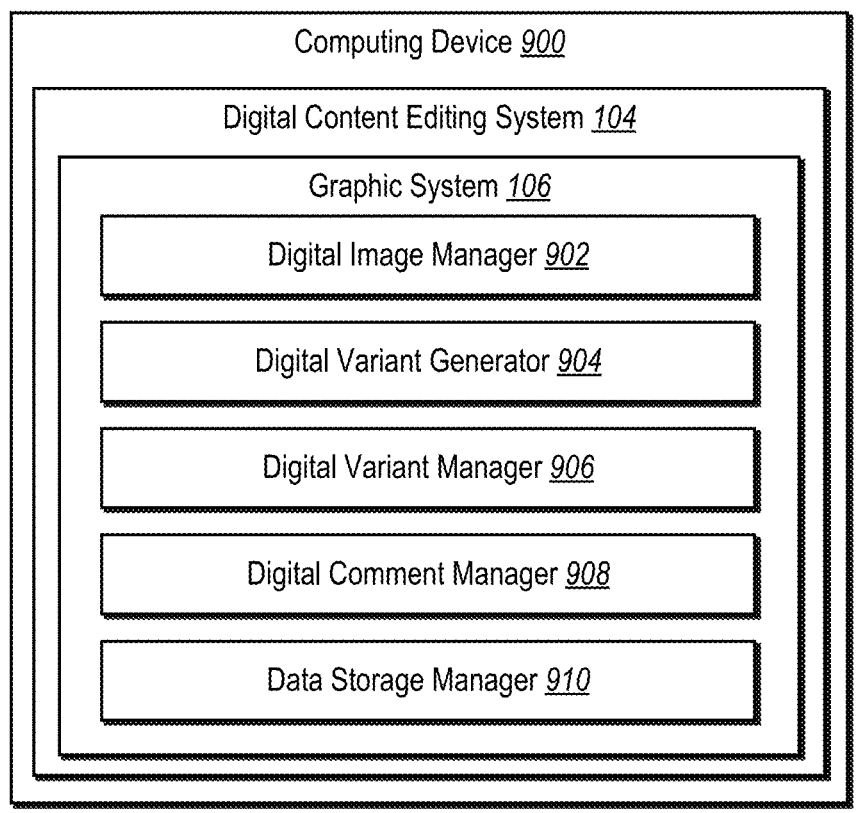
FIG. 9 illustrates a schematic diagram of a variant review system in accordance with one or more embodiments.

Turning now to FIG. 9, additional detail will now be provided regarding various components and capabilities of the variant review system 106. In particular, FIG. 9 illustrates the variant review system 106 implemented by the computing device 900 (e.g., the server device(s) 102, one of the client device(s) 110, and/or one of the designer device(s) 120, discussed above with reference to FIG. 1). Additionally, the variant review system 106 is also part of the digital content editing system 104. As shown in FIG. 9, the variant review system 106 includes, but is not limited to, a digital image manager 902, a digital variant generator 904, a digital variant manager 906, a digital comment manager 908, and a data storage manager 910.

As just mentioned, and as illustrated in FIG. 9, the variant review system 106 includes the digital image manager 902. In one or more embodiments, the digital image manager 902 retrieves or creates a digital image. As mentioned above, the digital image manager 902 manages digital images including digital images that incorporate multistate vector objects. Furthermore, the digital image manager 902 monitors and identifies changes to multistate vector objects within the digital images. For example, in one or more embodiments, the digital image manager 902 monitors and identifies user-initiated modifications, selections, and approvals of the multistate vector objects within the digital image.

Additionally, as shown in FIG. 9, the variant review system 106 includes the digital variant generator 904. The digital variant generator 904 creates variants of design elements within a digital image utilizing variant deltas to modify multistate vector objects. In particular, the digital variant generator 904 can update the digital image document to contain multiple variants of the multistate vector objects based on input from the client device(s) 110 and/or server device(s) 120. Furthermore, the digital variant generator 904 can update the digital image based on a selected variant of the multistate vector object.

As further shown in FIG. 9, the variant review system 106 includes the digital variant manager 906. In particular, the variant review system 106 facilitates the modification of multistate vector objects within a digital image. In particular, the digital variant manager 906 modifies a multistate vector object by applying variant deltas. For example, the digital variant manager 906 utilizes a variant curation interface to facilitate the creation and resolution of variants of multistate vector objects. Moreover, the digital variant manager 906 utilizes a variant review interface to facilitate the selection of variants of multistate vector objects. Furthermore, the digital variant manager 906 provides unique interface elements for selecting and transitioning between variants (e.g., displaying variant selection elements alongside the digital design).

As further shown in FIG. 9, the variant review system 106 includes the digital comment manager 908. In particular, the variant review system 106 facilitates the selection of variants of multistate vector objects within a digital image. In particular, the digital comment manager 908 provides a graphical user interface to automatically generate comments associated with selecting a variant of a multistate vector object within the digital image on the client device(s) 110 (e.g., via the variant review interface). In addition, the digital comment manager 908 provides a graphical user interface to resolve comments associated with a selected variant of a multistate vector object within the digital image on the designer device(s) 120 (e.g., via the variant curation interface). Furthermore, the digital comment manager 908 provides unique interface elements for generating, posting, and resolving the comments.

Additionally, as shown, the variant review system 106 includes data storage manager 910. In particular, data storage manager 910 (implemented by one or more memory devices) stores the digital images, including the multistate vector objects. The data storage manager 910 facilitates the use of the digital images by the variant review system 106.

Each of the components 902-910 of the variant review system 106 can include software, hardware, or both. For example, the components 902-910 can include one or more instructions stored on a computer-readable storage medium and executable by processors of one or more computing devices, such as a client device or server device. When executed by the one or more processors, the computer-executable instructions of the variant review system 106 can cause the computing device(s) to perform the methods described herein. Alternatively, the components 902-910 can include hardware, such as a special-purpose processing device to perform a certain function or group of functions. Alternatively, the components 902-910 of the variant review system 106 can include a combination of computer-executable instructions and hardware.

Furthermore, the components 902-910 of the variant review system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-910 of the variant review system 106 may be implemented as a stand-alone application, such as a desktop or mobile application. Furthermore, the components 902-910 of the variant review system 106 may be implemented as one or more web-based applications hosted on a remote server. Alternatively, or additionally, the components 902-910 of the variant review system 106 may be implemented in a suite of mobile device applications or "apps." For example, in one or more embodiments, the variant review system 106 can comprise or operate in connection with digital software applications such as: ADOBE® PHOTOSHOP, ADOBE® PHOTOSHOP ELEMENTS, ADOBE® ILLUSTRATOR, ADOBE® LIGHTROOM, ADOBE® INDESIGN, ADOBE® XD, ADOBE® FRESCO, ADOBE® PROTEUS, ADOBE® EXPRESS, ADOBE® ACROBAT PRO DC, or ADOBE® FIGMA. The foregoing are either registered trademarks or trademarks of Adobe Inc. in the United States and/or other countries.

Figure 10:
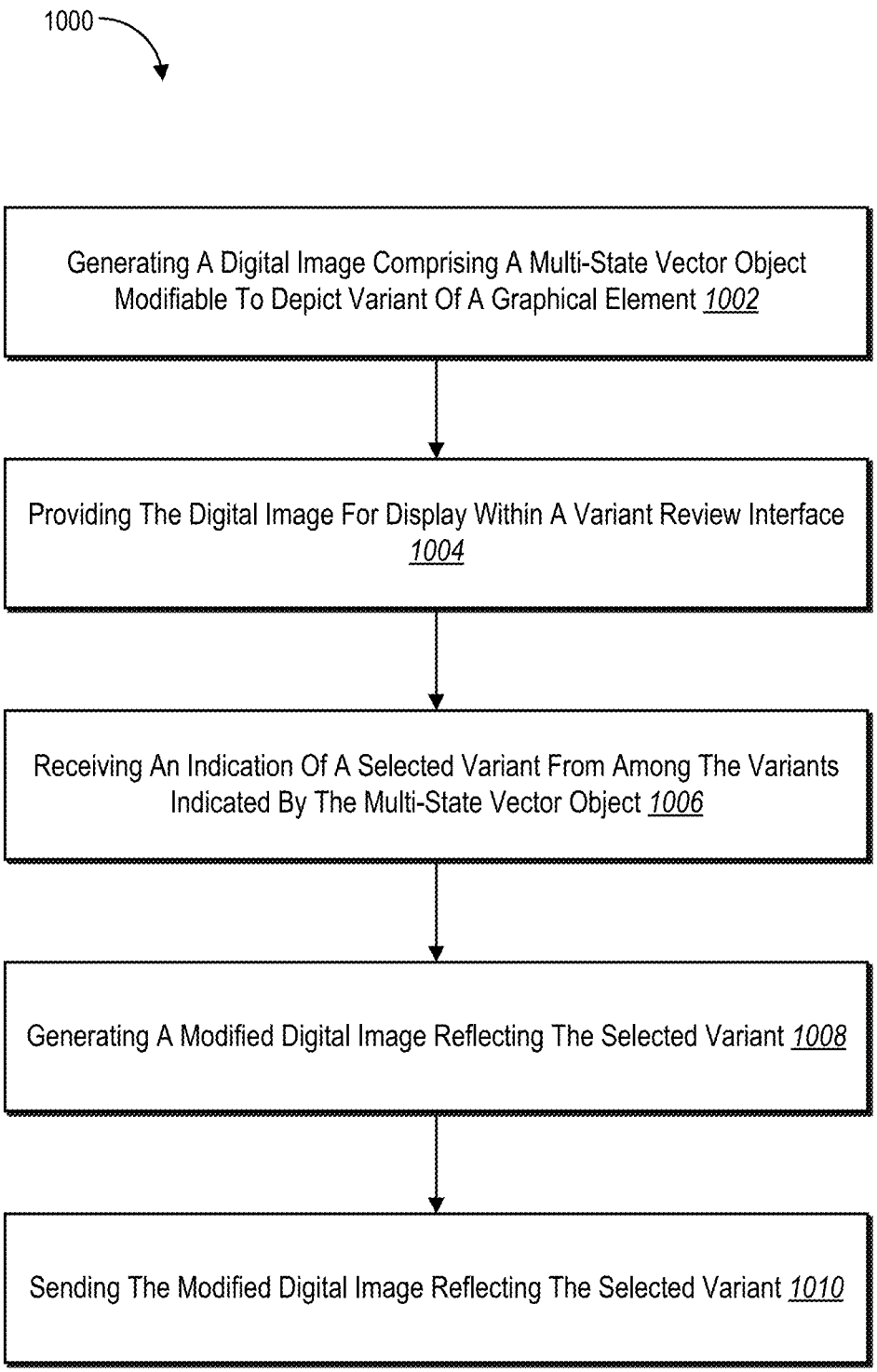
FIGS. 10-11 illustrate flowcharts of a series of acts for generating, reviewing, and modifying a multi-state vector object within a digital image in accordance with one or more embodiments.
Figure 11:
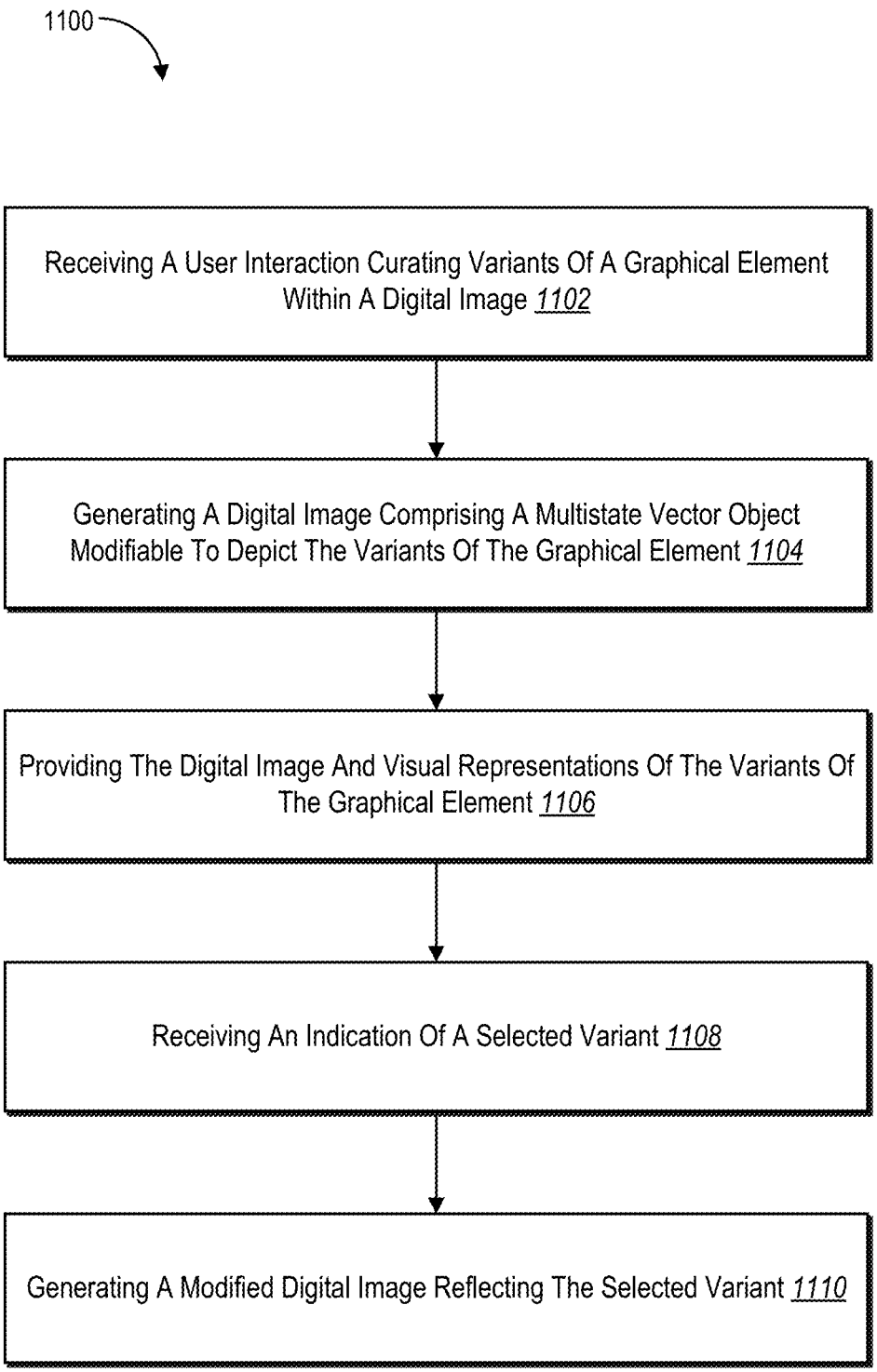

FIGS. 1-9, the corresponding text, and the examples provide a number of different methods, systems, devices, and non-transitory computer-readable media of the variant review system 106. In addition to the foregoing, one or more embodiments can also be described in terms of flowcharts comprising acts for accomplishing a particular result, as shown in FIGS. 10-11. The acts shown in FIGS. 10-11 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIGS. 10-11. In some embodiments, a system can be configured to perform the acts of FIGS. 10-11. Alternatively, the acts of FIGS. 10-11 can be performed as part of a computer-implemented method.

FIG. 10 illustrates a flowchart of a series of acts 1000 for modifying a digital image with a variant review system 106 in accordance with one or more embodiments. While FIG. 10 illustrates acts according to one embodiment, alternative embodiments may omit, add to, reorder, and/or modify any acts shown in FIG. 10.

FIG. 10 illustrates an example series of acts 1000 for utilizing a variant review system 106 to review a digital image. In particular, the series of acts 1000 includes an act 1002 of generating a digital image comprising a multistate vector object modifiable to depict variants of a graphical element. Specifically, the act 1002 can include generating, in response to a user interaction performed at a designer device, a digital image comprising a multistate vector object modifiable to depict variants of a graphical element within the digital image. As illustrated, the series of acts 1000 can also include an act 1004 of providing the digital image for display within a variant review interface. Specifically, the act 1004 can include providing the digital image for display within a variant review interface on a client device for reviewing the variants of the graphical element. As illustrated, the series of acts 1000 can also include an act 1006 of receiving an indication of a selected variant from among the variants indicated by the multistate vector object. Specifically, the act 1006 can include receiving, from the client device, an indication of a selected variant from among the variants indicated by the multistate vector object. As illustrated, the series of acts 1000 can also include an act 1008 of generating a modified digital image reflecting the selected variant. As illustrated, the series of acts 1000 can also include an act 1010 of sending the modified digital image reflecting the selected variant. Specifically, the act 1010 can include sending the modified digital image reflecting the selected variant to the designer device.

In addition (or in the alternative) to the acts described above, the variant review system series of acts 1000 can include generating, for the variants of the graphical element, variant deltas representing modifications to a base state of the multistate vector object. The series of acts 1000 can also include storing the variant deltas in a database for applying to the graphical element of the digital image. Moreover, in one or more embodiments, the variant review system 106 series of acts 1000 includes generating the modified digital image by updating the multistate vector object of the digital image to reflect the selected variant in response to the indication from the client device.

Further still, in some embodiments, the variant review system 106 series of acts 1000 includes generating, in response to the indication of the selected variant, a selection comment indicating the selected variant from the client device. Furthermore, in one or more embodiments, the variant review system series of acts 1000 includes providing the selection comment to the designer device. Moreover, in one or more embodiments, the series of acts 1000 receiving, from the designer device, a resolution input accepting the selected variant indicated by the selection comment.

Furthermore, in one or more embodiments, the variant review system series of acts 1000 includes receiving a variant creation input from the designer device to create a variant for the graphical element within the digital image. Moreover, in one or more embodiments, the series of acts 1000 includes, in response to the variant creation input, generating the multistate vector object to represent multiple variants of the graphical element within the digital image. Further still, in one or more embodiments, the series of acts 1000 includes providing the digital image for display within the variant review interface on the client device by providing visual representations of each of the variants of the graphical element for display within the variant review interface together with options for selecting the variants.

Moreover, in one or more embodiments, the series of acts 1000 includes generating, based on a variant creation input from a designer device, multiple variants of the graphical element. Further, in one or more embodiments, the series of acts 1000 includes providing, to the client device and based on a share request from the designer device, the digital image comprising the multistate vector object representing the multiple variants of the graphical element within the digital image.

Further still, in one or more embodiments, the series of acts 1000 includes generating, in response to a user interaction with a designer device, a digital image comprising a multistate vector object modifiable to depict variants of a graphical element within the digital image. Moreover, in one or more embodiments, the series of acts 1000 includes providing, for display within a variant review interface on a client device, the digital image and visual representations of the variants of the graphical element indicated by the multistate vector object. Furthermore, in one or more embodiments, the series of acts 1000 includes receiving, from the client device, an indication of a selected variant from among the variants indicated by the multistate vector object. Moreover, in one or more embodiments, the series of acts 1000 includes generating a modified digital image reflecting the selected variant.

Further still, in one or more embodiments, the series of acts 1000 includes generating, for the variants of the graphical element, variant deltas representing modifications to a base state of the multistate vector object. Moreover, in one or more embodiments, the series of acts 1000 includes determining, based on the indication of the selected variant, a variant delta from among the variant deltas corresponding to the selected variant. Further, in one or more embodiments, the series of acts 1000 includes generating the modified digital image by applying the variant delta to modify the base state of the multistate vector object.

Moreover, in one or more embodiments, the series of acts 1000 includes receiving a variant creation input from the designer device to create a variant for the graphical element within the digital image. Further, in one or more embodiments, the series of acts 1000 includes, in response to the variant creation input, generating the multistate vector object to represent multiple variants of the graphical element within the digital image. Furthermore, in one or more embodiments, the series of acts 1000 includes providing, for display within a variant curation interface on the designer device, the variants of the graphical element within the digital image. Further, in one or more embodiments, the series of acts 1000 includes receiving, from the designer device, a variant creation input to create a variant of an additional multistate vector object corresponding to an additional graphical element of the digital image. Moreover, in one or more embodiments, the series of acts 1000 includes providing, for display within the variant review interface on the client device, interface elements for selecting the variants for the multistate vector object and an interface element for selecting the variant of the additional multistate vector object.

Further, in one or more embodiments, the series of acts 1000 includes generating, in response to the indication of the selected variant, a selection comment indicating the selected variant from the client device and providing the selection comment to the designer device. Moreover, in one or more embodiments, the series of acts 1000 includes generating the variants of the graphical element based on variant creation inputs from the designer device. Furthermore, in one or more embodiments, the series of acts 1000 includes receiving a share request from the designer device to share the digital image comprising the multistate vector object with the client device. Further still, in one or more embodiments, the series of acts 1000 includes, in response to the share request, providing the digital image of the multistate vector object to the client device for display together with visual representations of the variants within the variant review interface.

Turning to FIG. 11. As mentioned, FIG. 11 illustrates a flowchart of a series of acts 1100 for modifying a digital image with a variant review system 106 in accordance with one or more embodiments. While FIG. 11 illustrates acts according to one embodiment, alternative embodiments may omit, add to, reorder, and/or modify any acts shown in FIG. 11.

FIG. 11 illustrates an example series of acts 1100 for utilizing a variant review system 106 to review a digital image. In particular, the series of acts 1100 includes an act 1102 of receiving a user interaction curating variants of a graphical element within a digital image. As illustrated, the series of acts 1100 can also include an act 1104 of generating a digital image comprising a multistate vector object modifiable to depict the variants of the graphical element. Specifically, the act 1104 can include generating, in response to the user interaction, a digital image comprising a multistate vector object modifiable to depict the variants of the graphical element within the digital image. As illustrated, the series of acts 1100 can also include an act 1106 of providing the digital image and visual representations of the variants of the graphical element. Specifically, the act 1106 can include providing, to a client device, the digital image and visual representations of the variants of the graphical element indicated by the multistate vector object. As illustrated, the series of acts 1100 can also include an act 1108 of receiving an indication of a selected variant. Specifically, the act 1108 can include receiving, from the client device, an indication of a selected variant from among the variants of the graphical element. As illustrated, the series of acts 1100 can also include an act 1110 of generating a modified digital image reflecting the selected variant. Specifically, the act 1110 can include generating a modified digital image reflecting the selected variant from among the variants indicated by the multistate vector object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
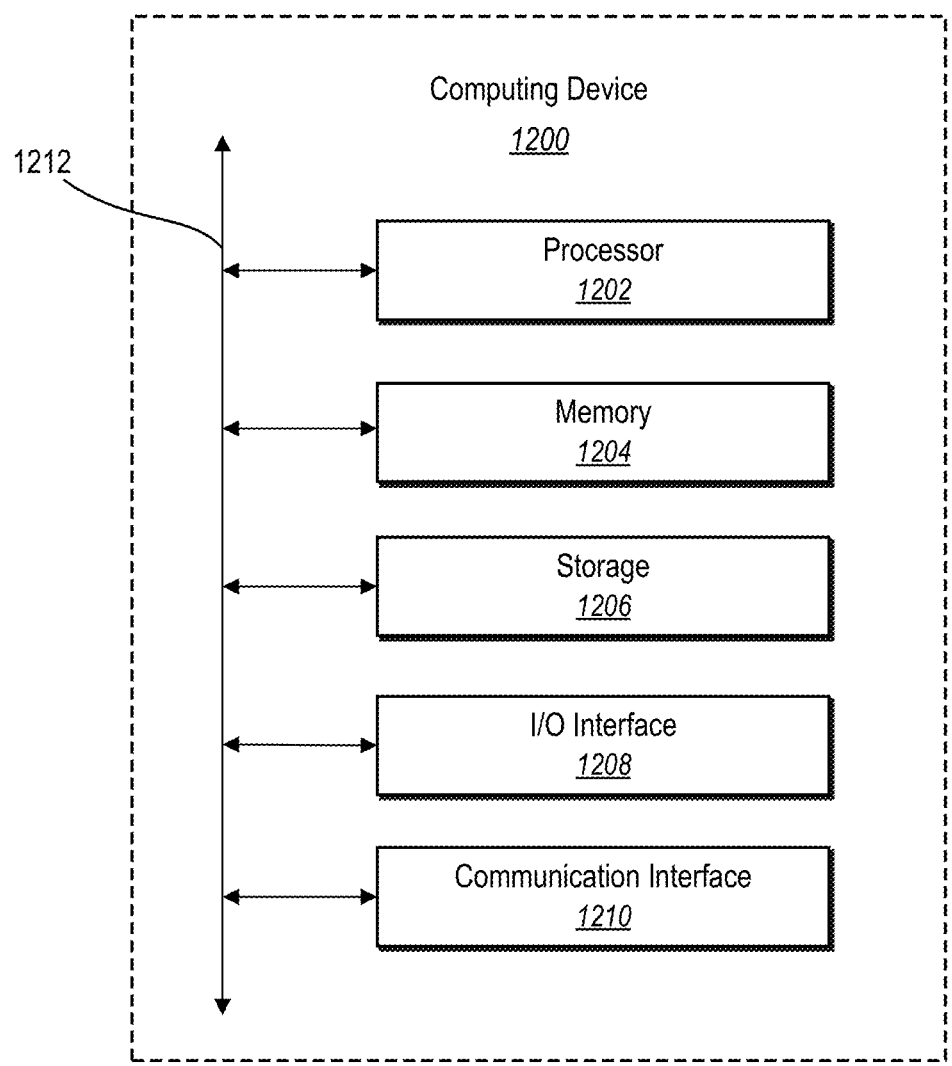
FIG. 12 illustrates a block diagram of an example computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., server device(s) 102, client device(s) 110, and computing device 1200). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
generating, for variants of a graphical element, variant deltas representing modifications to a base state of a multistate vector object;
storing the variant deltas in a database for applying to the graphical element of a digital image;
generating, in response to a user interaction performed at a designer device, the digital image comprising the multistate vector object modifiable to depict the variants of the graphical element within the digital image according to the variant deltas;

providing the digital image for display within a variant review interface on a client device for reviewing the variants of the graphical element;

receiving, from the client device, an indication of a selected variant from among the variants indicated by the multistate vector object;

generating a modified digital image reflecting the selected variant; and sending the modified digital image reflecting the selected variant to the designer device.

2. The method of claim 1, further comprising providing, for display within the variant review interface, the variants of the graphical element utilizing the variant deltas.

3. The method of claim 1, wherein generating the modified digital image comprises updating the multistate vector object of the digital image to reflect the selected variant in response to the indication from the client device.

4. The method of claim 1, wherein generating the modified digital image comprises:

generating, in response to the indication of the selected variant, a selection comment indicating the selected variant from the client device;

providing the selection comment to the designer device; and receiving, from the designer device, a resolution input accepting the selected variant indicated by the selection comment.

5. The method of claim 1, further comprising generating the multistate vector object by:

receiving a variant creation input from the designer device to create a variant for the graphical element within the digital image; and in response to the variant creation input, generating the multistate vector object to represent multiple variants of the graphical element within the digital image.

6. The method of claim 1, wherein providing the digital image for display within the variant review interface on the client device comprises providing visual representations of each of the variants of the graphical element for display within the variant review interface together with options for selecting the variants.

7. The method of claim 1, further comprising:

generating, based on a variant creation input from a designer device, multiple variants of the graphical element; and providing, to the client device and based on a share request from the designer device, the digital image comprising the multistate vector object representing the multiple variants of the graphical element within the digital image.

8. A system comprising:

a memory component; and one or more processing devices coupled to the memory component, the one or more processing devices to perform operations comprising:

generating, for variants of a graphical element, variant deltas representing modifications to a base state of a multistate vector object;

receiving a user interaction curating the variants of the graphical element within a digital image;

generating, in response to the user interaction, a digital image comprising a multistate vector object modifiable to depict the variants of the graphical element within the digital image;

providing, to a client device, the digital image and visual representations of the variants of the graphical element indicated by the multistate vector object;

receiving, from the client device, an indication of a selected variant from among the variants of the graphical element;

determining, based on the indication of the selected variant, a variant delta from among the variant deltas corresponding to the selected variant; and generating a modified digital image reflecting the selected variant from among the variants indicated by the multistate vector object by applying the variant delta to modify the base state of the multistate vector object.

9. The system of claim 8, wherein the operations further comprise providing the modified digital image reflecting the selected variant to a designer device.

10. The system of claim 8, wherein the operations further comprise generating the multistate vector object by, in response to the user interaction curating the variants, generating the multistate vector object to represent multiple variants of the graphical element within the digital image.

11. The system of claim 8, wherein the operations further comprise providing, for display within a variant curation interface, the variants of the graphical element within the digital image.

12. The system of claim 8, wherein the operations further comprise:

receiving a variant creation input to create a variant of an additional multistate vector object corresponding to an additional graphical element of the digital image; and providing, for display within a variant review interface on the client device, interface elements for selecting the variants for the multistate vector object and an interface element for selecting the variant of the additional multistate vector object.

13. The system of claim 8, wherein the operations further comprise:

generating, in response to the indication of the selected variant, a selection comment indicating the selected variant from the client device; and providing the selection comment to a designer device.

14. The system of claim 8, wherein the operations further comprise:

generating the variants of the graphical element based on variant creation inputs from a designer device;

receiving a share request to share the digital image comprising the multistate vector object with the client device; and in response to the share request, providing the digital image comprising the multistate vector object to the client device for display together with visual representations of the variants within a variant review interface.

15. A non-transitory computer readable medium storing executable instructions which, when executed by a processing device, cause the processing device to perform operations comprising:

generating, for variants of a graphical element, variant deltas representing modifications to a base state of a multistate vector object;

storing the variant deltas in a database for applying to the graphical element of a digital image;

generating, in response to a user interaction performed at a designer device, the digital image comprising the multistate vector object modifiable to depict the variants of the graphical element within the digital image according to the variant deltas;

providing the digital image for display within a variant review interface on a client device for reviewing the variants of the graphical element;

receiving, from the client device, an indication of a selected variant from among the variants indicated by the multistate vector object;

generating a modified digital image reflecting the selected variant; and sending the modified digital image reflecting the selected variant to the designer device.

16. The non-transitory computer readable medium of claim 15, wherein the operations further comprise providing, for display within the variant review interface, the variants of the graphical element utilizing the variant deltas.

17. The non-transitory computer readable medium of claim 15, wherein generating the modified digital image comprises updating the multistate vector object of the digital image to reflect the selected variant in response to the indication from the client device.

18. The non-transitory computer readable medium of claim 15, wherein generating the modified digital image comprises:

generating, in response to the indication of the selected variant, a selection comment indicating the selected variant from the client device;

providing the selection comment to the designer device; and receiving, from the designer device, a resolution input accepting the selected variant indicated by the selection comment.

19. The non-transitory computer readable medium of claim 15, wherein the operations further comprise generating the multistate vector object by:

receiving a variant creation input from the designer device to create a variant for the graphical element within the digital image; and in response to the variant creation input, generating the multistate vector object to represent multiple variants of the graphical element within the digital image.

20. The non-transitory computer readable medium of claim 15, wherein providing the digital image for display within the variant review interface on the client device comprises providing visual representations of each of the variants of the graphical element for display within the variant review interface together with options for selecting the variants.

* * * * *